(12) United States Patent
Terada et al.

(10) Patent No.: US 9,894,352 B2
(45) Date of Patent: Feb. 13, 2018

(54) MOVING PICTURE CODING METHOD, MOVING PICTURE CODING APPARATUS, MOVING PICTURE DECODING METHOD, MOVING PICTURE DECODING APPARATUS, AND MOVING PICTURE CODING AND DECODING APPARATUS

(71) Applicant: Panasonic Intellectual Property Corporation of America, Torrance, CA (US)

(72) Inventors: Kengo Terada, Osaka (JP); Youji Shibahara, Osaka (JP); Kyoko Tanikawa, Osaka (JP); Hisao Sasai, Osaka (JP); Toshiyasu Sugio, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 316 days.

(21) Appl. No.: 13/897,975

(22) Filed: May 20, 2013

(65) Prior Publication Data
US 2013/0336388 A1 Dec. 19, 2013

Related U.S. Application Data

(60) Provisional application No. 61/651,647, filed on May 25, 2012.

(51) Int. Cl.
*H04N 19/91* (2014.01)
*H04N 19/124* (2014.01)
*H04N 19/00* (2014.01)

(52) U.S. Cl.
CPC ......... *H04N 19/0009* (2013.01); *H04N 19/91* (2014.11)

(58) Field of Classification Search
CPC ................................. H04N 19/00; H04N 19/91
(Continued)

(56) References Cited

U.S. PATENT DOCUMENTS

| 6,900,748 | B2 * | 5/2005 | Marpe | H03M 7/40 |
| | | | | 341/107 |
| 7,088,271 | B2 * | 8/2006 | Marpe | H03M 7/40 |
| | | | | 341/107 |

(Continued)

FOREIGN PATENT DOCUMENTS

| CN | 1949873 | 4/2007 |
| CN | 101771879 | 7/2010 |

(Continued)

OTHER PUBLICATIONS

Benjamin Bross et al., "High efficiency video coding (HEVC) text specification draft 6", Joint Collaborative Team on Video Coding (JCT-VC) of ITU-T SG16 WP3 and ISO/IEC JTC1/SC29/WG11, JCTVC-H1003, 8th Meeting: San José, CA, USA, Feb. 1-10, 2012.

(Continued)

*Primary Examiner* — Christopher S Kelley
*Assistant Examiner* — Kathleen Walsh
(74) *Attorney, Agent, or Firm* — Wenderoth, Lind & Ponack, L.L.P.

(57) ABSTRACT

Provided is a moving picture coding method for performing arithmetic coding on a quantization parameter to be used in quantizing a current block that is to be coded and is included in a current picture to be coded, the quantization parameter including a parameter indicating a sign and a parameter indicating an absolute value, the method including: binarizing the parameter indicating the absolute value without requiring information on a maximum value of the absolute value; binarizing the parameter indicating the sign without requiring information on a maximum value of the sign; and (Continued)

performing bypass arithmetic coding, using a fixed probability, sequentially on (i) a latter half of the binarized parameter indicating the absolute value and (ii) the binarized parameter indicating the sign.

13 Claims, 35 Drawing Sheets

(58) Field of Classification Search
USPC .................................................. 375/240.03
See application file for complete search history.

(56) References Cited

U.S. PATENT DOCUMENTS

| | | | |
|---|---|---|---|
| 7,535,387 B1* | 5/2009 | Delva | H03M 7/4006 341/107 |
| 7,860,160 B2* | 12/2010 | Shimazaki | H04N 19/61 348/723 |
| 8,581,753 B2* | 11/2013 | Kim | H03M 7/4018 341/107 |
| 8,781,001 B2 | 7/2014 | Sasai et al. | |
| 8,837,582 B2* | 9/2014 | He et al. | 375/240.03 |
| 8,907,823 B2* | 12/2014 | Marpe | H03M 7/4006 341/107 |
| 8,947,273 B2* | 2/2015 | Bartnik | 341/107 |
| 9,042,440 B2* | 5/2015 | Sole Rojals et al. | 375/240.02 |
| 2001/0017944 A1 | 8/2001 | Kalevo et al. | |
| 2005/0012648 A1 | 1/2005 | Marpe et al. | |
| 2005/0038837 A1* | 2/2005 | Marpe | H03M 7/40 708/200 |
| 2006/0028359 A1 | 2/2006 | Kim et al. | |
| 2006/0156204 A1 | 7/2006 | Lee et al. | |
| 2006/0280371 A1* | 12/2006 | Shimazaki | H04N 19/61 382/239 |
| 2006/0285757 A1 | 12/2006 | Abe et al. | |
| 2007/0040711 A1 | 2/2007 | Ziauddin | |
| 2007/0080832 A1 | 4/2007 | Yang et al. | |
| 2007/0171985 A1 | 7/2007 | Kim et al. | |
| 2008/0063084 A1 | 3/2008 | Xue et al. | |
| 2009/0089549 A1* | 4/2009 | Liu | H03M 7/4006 712/208 |
| 2009/0195681 A1 | 8/2009 | Compton et al. | |
| 2011/0228858 A1* | 9/2011 | Budagavi | H04N 19/70 375/240.25 |
| 2011/0243226 A1 | 10/2011 | Choi et al. | |
| 2011/0310958 A1 | 12/2011 | Sachdeva et al. | |
| 2012/0014454 A1* | 1/2012 | Budagavi | H04N 19/91 375/240.16 |
| 2012/0027083 A1 | 2/2012 | Narroschke et al. | |
| 2012/0057637 A1 | 3/2012 | Flachs et al. | |
| 2012/0069906 A1 | 3/2012 | Sato | |
| 2012/0127002 A1 | 5/2012 | Shibahara et al. | |
| 2012/0170647 A1* | 7/2012 | He et al. | 375/240.03 |
| 2012/0177107 A1 | 7/2012 | Fu et al. | |
| 2012/0294353 A1 | 11/2012 | Fu et al. | |
| 2012/0300839 A1* | 11/2012 | Sze | H04N 19/91 375/240.12 |
| 2012/0320971 A1* | 12/2012 | Xu | H03M 7/4018 375/240.03 |
| 2012/0328001 A1* | 12/2012 | He et al. | 375/240.03 |
| 2013/0003824 A1* | 1/2013 | Guo et al. | 375/240.03 |
| 2013/0003838 A1* | 1/2013 | Gao | H04N 19/176 375/240.12 |
| 2013/0003840 A1* | 1/2013 | Gao et al. | 375/240.12 |
| 2013/0003849 A1* | 1/2013 | Chien | H04N 19/13 375/240.16 |
| 2013/0016777 A1* | 1/2013 | Gao et al. | 375/240.12 |
| 2013/0027230 A1* | 1/2013 | Marpe | H03M 7/4006 341/107 |
| 2013/0064294 A1* | 3/2013 | Sole Rojals et al. | 375/240.12 |
| 2013/0083856 A1* | 4/2013 | Sole Rojals | H04N 19/00951 375/240.18 |
| 2013/0107951 A1* | 5/2013 | Sole Rojals | H04N 19/13 375/240.12 |
| 2013/0114668 A1 | 5/2013 | Misra et al. | |
| 2013/0114674 A1 | 5/2013 | Chong et al. | |
| 2013/0114691 A1* | 5/2013 | Guo et al. | 375/240.03 |
| 2013/0114693 A1* | 5/2013 | Gao | H04N 19/593 375/240.03 |
| 2013/0114716 A1* | 5/2013 | Gao et al. | 375/240.14 |
| 2013/0114738 A1* | 5/2013 | Chien | H03M 7/4018 375/240.24 |
| 2013/0128966 A1* | 5/2013 | Gao et al. | 375/240.12 |
| 2013/0129238 A1 | 5/2013 | Sasai et al. | |
| 2013/0136375 A1 | 5/2013 | Sasai et al. | |
| 2013/0177069 A1* | 7/2013 | Sze | H04N 19/00121 375/240.02 |
| 2013/0187796 A1* | 7/2013 | Kim | H03M 7/4018 341/51 |
| 2013/0188734 A1* | 7/2013 | Kim | H03M 7/4018 375/240.25 |
| 2013/0223542 A1 | 8/2013 | Kim et al. | |
| 2013/0272389 A1* | 10/2013 | Sze | H04N 19/00121 375/240.03 |
| 2013/0294501 A1 | 11/2013 | Sze et al. | |
| 2013/0315297 A1 | 11/2013 | Sasai et al. | |
| 2013/0336382 A1 | 12/2013 | Sole Rojals et al. | |
| 2014/0140400 A1* | 5/2014 | George | H04N 19/52 375/240.12 |
| 2014/0210652 A1* | 7/2014 | Bartnik | H03M 7/40 341/67 |
| 2014/0307778 A1* | 10/2014 | He et al. | 375/240.02 |
| 2014/0334559 A1 | 11/2014 | Kim et al. | |
| 2015/0098513 A1 | 4/2015 | Fu et al. | |
| 2015/0172666 A1 | 6/2015 | Fu et al. | |
| 2015/0181214 A1 | 6/2015 | Alshina et al. | |

FOREIGN PATENT DOCUMENTS

| | | |
|---|---|---|
| CN | 102186087 | 9/2011 |
| CN | 102231830 | 11/2011 |
| JP | 2007-142637 | 6/2007 |
| JP | 2012-023613 | 2/2012 |
| RU | 2 358 410 | 6/2009 |
| RU | 2 370 816 | 10/2009 |
| RU | 2 439 682 | 1/2012 |
| TW | 200939760 | 9/2009 |
| TW | 201130315 | 9/2011 |
| TW | 201134225 | 10/2011 |
| WO | 2008/002897 | 1/2008 |
| WO | 2013/188558 | 12/2013 |
| WO | 2014/008109 | 1/2014 |
| WO | 2014/014251 | 1/2014 |

OTHER PUBLICATIONS

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_dl, Ver.2, 9th Meeting: Geneva, CH, Apr. 27-May 7, 2012.

Vadim Seregin et al., "Bypass bins for reference index and delta QP coding", Joint Collaborative Team on Video Coding (JCT-VC) of ITU-T SG 16 WP 3 and ISO/IEC JTC 1/SC 29/WG 11, JCTVC-I0594, 9th Meeting: Geneva, CH, Apr. 27-May 7, 2012.

Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012, Version 4.

"Advanced video coding for generic audiovisual services", ITU-T Recommendation H. 264, Mar. 2010.

Benjamin Bross et al., "High efficiency video coding (HEVC) text specification draft 7", Joint Collaborative Team on Video Coding (JCT-VC) of ITU-T SG16 WP3 and ISO/IEC JTC1/SC29/WG11, JCTVC-I1003_d2, Ver.3, 9th Meeting: Geneva, CH, Apr. 27-May 7, 2012.

(56) References Cited

OTHER PUBLICATIONS

Benjamin Bross et al., "Suggested bug-fixes for HEVC text specification draft 6", Joint Collaborative Team on Video Coding (JCT-VC) of ITU-T SG16 WP3 and ISO/IEC JTC1/SC29/WG11, JCTVC-I0030, 9th Meeting: Geneva, CH, Apr. 27-May 7, 2012, Version 3.
International Search Report dated Aug. 6, 2013 in International (PCT) Application No. PCT/JP2013/003113.
Written Opinion of the International Searching Authority dated Jul. 9, 2013 in International (PCT) Application No. PCT/JP2013/002396 (with English translation).
International Search Report dated Aug. 20, 2013 in International (PCT) Application No. PCT/JP2013/003158.
International Search Report dated Aug. 20, 2013 in International (PCT) Application No. PCT/JP2013/003141.
Vivienne Sze, "Reduction in context coded bins for ref_idx and cu_qo_delta", Joint Collaborative Team on Video Coding (JCT-VC) of ITU-T SG16 WP3 and ISO/IEC JTC1/SC29/WG11, JCTVC-I0204, 9th Meeting: Geneva, CH, Apr. 27-May 7, 2012.
Chih-Ming Fu et al., "Non-CE1: Bug-fix of offset coding in SAO interleaving mode", Joint Collaborative Team on Video Coding (JCT-VC) of ITU-T SG16 WP3 and ISO/IEC JTC1/SC29/WG11 JCTVC-I0168, 9th Meeting: Geneva, CH, Apr. 27-May 7, 2012.
Yu-Wen Huang, "BoG report on SAO", Joint Collaborative Team on Video Coding (JCT-VC) of ITU-T SG16 WP3 and ISO/IEC JTC1/SC29/WG11 JCTVC-I0576, 9th Meeting: Geneva, CH, Apr. 27-May 7, 2012.
Hisao Sasai, "Modified MVD coding for CABAC", Joint Collaborative Team on Video Coding (JCT-VC) of ITU-T SG 16 WP3 and ISO/IEC JTC1/SC29/WG11 JCTVC-F423, 6th Meeting: Torino, IT, Jul. 14-22, 2011.
Vadim Seregin, "Binarisation modification for last position coding", Joint Collaborative Team on Video Coding (JCT-VC) of ITU-T SG 16 WP3 and ISO/EC JCT1/SC29/WG11, JCTVC-F375, 6th Meeting: Torino, IT, Jul. 14-22, 2011.
Yu-Wen Huang, "BoG report on intergrated text of SAO adoptions on top of JCTVC-I0030", Joint Collaborative Team on Video Coding (JCT-VC) of ITU-T SG16 WP3 and ISO/IEC JTC1/SC29/WG11, JCTVC-I0602, 9th Meeting: Geneva, CH, Apr. 27-May 7, 2012.
International Search Report issued Jul. 9, 2013 in International (PCT) Application No. PCT/JP2013/002396.
Extended European Search Report dated Mar. 27, 2015 in European Application No. 13800607.7.
Extended European Search Report dated Mar. 27, 2015 in European Application No. 13793080.6.
E. Maani et al., "SAO Type Coding Simplification", Joint Collaborative Team on Video Coding (JCT-VC) of ITU-T SG16 WP3 and ISO/IEC JTC1/SC29/WG11, JCTVC-I0246, 9th Meeting: Geneva, CH, Apr. 27-May 7, 2012, XP030052835.
Tom Matsunobu et al., "AHG5/AHG6: Bypass Coding for SAO syntax elements", Joint Collaborative Team on Video Coding (JCT-VC) of ITU-T SG16 WP3 and ISO/IEC JTC1/SC29/WG11, JCTVC-J0148, 10th Meeting: Stockholm, Sweden, Jul. 11-20, 2012, XP030112510.
C. Rosewarne et al., "AHG5: On SAO syntax elements coding", Joint Collaborative Team on Video Coding (JCT-VC) of ITU-T SG16 WP3 and ISO/IEC JTC1/SC29/WG11, JCTVC-J0178, 10th Meeting: Stockholm, SE, Jul. 11-20, 2012, XP030112540.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066, 9th Meeting: Geneva, CH, Apr. 27-May 7, 2012, XP030111829.
Joel Sole et al., "AhG6: Bypass bins grouping in SAO", Joint Collaborative Team on Video Coding (JCT-VC) of ITU-T SG16 WP3 and ISO/IEC JTC1/SC29/WG11, JCTVC-J0054, 10th Meeting: Stockholm, SE, Jul. 11-20, 2012, XP030112416.
Akira Minezawa et al., "Non-CE1: Improved edge offset coding for SAO", Joint Collaborative Team on Video Coding (JCT-VC) of ITU-T SG16 WP3 and ISO/IEC JTC1/SC29/WG11, JCTVC-I0066_r2, 9th Meeting: Geneva, CH, Apr. 27-May 7, 2012, XP030052650.
Guillaume Laroche et al., "Non-CE1: On SAO parameters reduction for Chroma", Joint Collaborative Team on Video Coding (JCT-VC) of ITU-T SG16 WP3 and ISO/IEC JTC1/SC29/WG11, JCTVC-I0183, 9th Meeting: Geneva, CH, Apr. 27-May 7, 2012, XP030111946.
Extended European Search Report issued Jul. 27, 2015 in European Application No. 13794340.3.
Detlev Marpe et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636, XP055120073.
Woo-Shik Kim et al., "AhG6: SAO Offset Bypass Coding", Joint Collaborative Team on Video Coding (JCT-VC) of ITU-T SG16 WP3 and ISO/IEC JTC1/SC29/WG11, JCTVC-J0141, 10th Meeting: Stockholm, SE, Jul. 11-20, 2012, XP030112503.
Office Action dated Nov. 14, 2016 in U.S. Appl. No. 14/509,199.
Office Action and Search Report dated Sep. 19, 2016 in Taiwanese Patent Application No. 102117756, with English translation of the Search Report.
Vivienne Sze et al., "Reduction in context coded bins for ref_idx and cu_qp_delta", Joint Collaborative Team on Video Coding (JCT-VC) of ITU-T SG 16 WP 3 and ISO/IEC JTC 1/SC 29/WG 11, JCTVC-I0204, 9th Meeting: Geneva, CH, Apr. 27-May 7, 2012, pp. 1-5.
Office Action dated Oct. 20, 2016 in U.S. Appl. No. 13/898,722.
Examination Report dated Jan. 17, 2017 in Singapore Patent Application No. 201400081-4.
Office Action dated Jun. 29, 2017 in U.S. Appl. No. 15/170,068.
Notice of Allowance dated Apr. 25, 2017 in U.S. Appl. No. 13/898,722.
Office Action dated May 25, 2017 in U.S. Appl. No. 14/509,199.
Toru Matsunobu et al., "AHG5/AHG6: Bypass coding for SAO syntax elements", Joint Collaborative Team on Video Coding (JCT-VC) of ITU-T SG 16 WP 3 and ISO/IEC JTC 1/SC 29/WG 11, 10th Meeting: Stockholm, Sweden, Jul. 11-20, 2012, Jul. 11, 2012, JCTVC-J0148r1.doc, URL: http://phenix.it-sudparis.eu/jct/doc_end_user/documents/10_Stockholm/wg11/JCTVC-J0148-v3.zip.
In Suk Chong et at, "AHG6/AHG5: Simplified SAO coding", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 9, 2012, JCTVC-J0347-v3.doc, URL: http://phenix.it-sudparis.eu/jct/doc_end_user/documents/10_Stockholm/wg11/JCTVC-J0347-v4.zip.
In Suk Chong et al., "AHG6/AHG5: SAO offset coding", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 3, 2012, JCTVC-J0106, URLhttp://phenix.it-sudparis.eu/jct/doc_end_user/documents/10_Stockholm/wg11/JCTVC-J0106-v2.zip.
Woo-shik Kim et al., "AhG6: SAO Offset Bypass Coding", Joint Collaborative Team on Video Coding (JCT-VC) of ITU-T SG 16 WP 3 and ISO/IEC JTC1/SC 29/WG 11, 10th Meeting: Stockholm, SE, Jul. 11-20, 2012, Jul. 11, 2012, JCTVC-J0141, URLhttp://phenix.it-sudparis.eu/jct/doc_end_user/documents/10_Stockholm/wg11/JCTVC-J0141-v2.zip.
Elena Alshina et al., "AHG6: On left band position coding in SAO", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 11, 2012, JCTVC-J0046, URLhttp://phenix.it-sudparis.eu/jct/doc_end_user/documents/10_Stockholm/wg11/JCTVC-J0046-v3.zip.
Jun Xu et al., "AHG6: on SAO signalling", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Jul. 14, 2012, JCTVC-J0268_r2.doc, URL: http://phenix.it-sudparis.eu/jct/doc_end_user/documents/10_Stockholm/wg11/JCTVC-J0268-v4.zip.

* cited by examiner

FIG. 7

| Non-binary signal | Bin string | | | |
|---|---|---|---|---|
| | binIdx | | | |
| | 0 | 1 | 2 | 3 |
| 0 | 0 | | | |
| 1 | 1 | 0 | | |
| 2 | 1 | 1 | 0 | |
| 3 | 1 | 1 | 1 | 0 |
| 4 | 1 | 1 | 1 | 1 |

FIG. 8

| Non-binary signal | Bin string | | | | | | | | | |
|---|---|---|---|---|---|---|---|---|---|---|
| | binIdx | | | | | | | | | |
| | 0 | 1 | 2 | 3 | 4 | 5 | 6 | 7 | 8 | 9 |
| 0 | 0 | | | | | | | | | |
| 1 | 1 | 0 | 0 | | | | | | | |
| 2 | 1 | 0 | 1 | | | | | | | |
| 3 | 1 | 1 | 0 | 0 | 0 | | | | | |
| 4 | 1 | 1 | 0 | 0 | 1 | | | | | |
| 5 | 1 | 1 | 0 | 1 | 0 | | | | | |
| 6 | 1 | 1 | 0 | 1 | 1 | | | | | |
| 7 | 1 | 1 | 1 | 0 | 0 | 0 | 0 | | | |
| 8 | 1 | 1 | 1 | 0 | 0 | 0 | 1 | | | |
| 9 | 1 | 1 | 1 | 0 | 0 | 1 | 0 | | | |
| 10 | 1 | 1 | 1 | 0 | 0 | 1 | 1 | | | |
| 11 | 1 | 1 | 1 | 0 | 1 | 0 | 0 | | | |
| ... | | | | | | | | | | |

FIG. 9

| | | | binIdx | | | | |
|---|---|---|---|---|---|---|---|
| | 0 | 1 | 2 | 3 | 4 | 5 | 6 |
| Embodiment 1 | Context 0 | Context 1 | Bypass | | | | |
| Change 1 | Context 0 | | Bypass | | | | |
| Change 2 | | | Bypass | | | | |

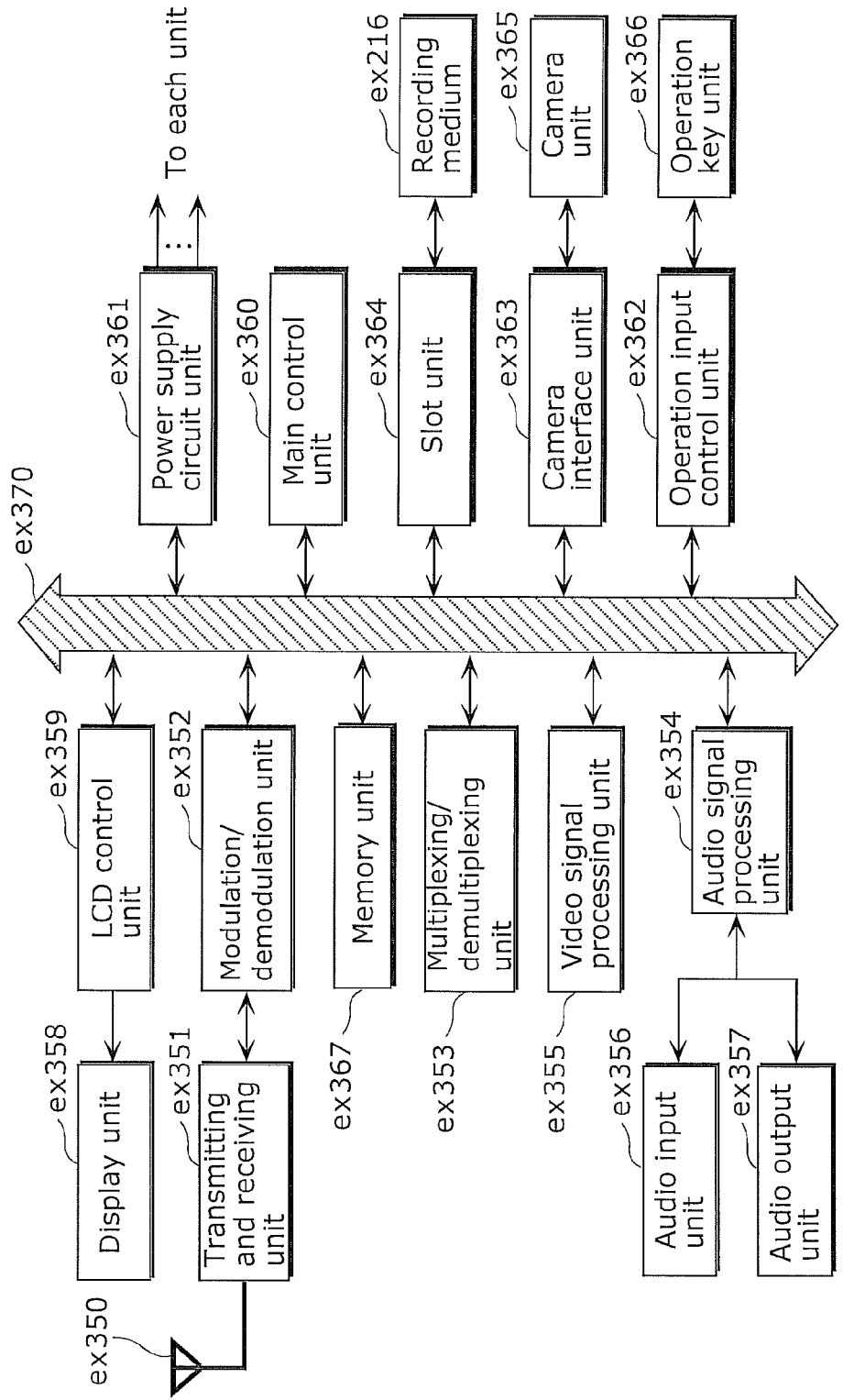

FIG. 22

| Video stream (PID=0x1011, Primary video) | Audio stream (PID=0x1100) | Audio stream (PID=0x1101) | Presentation graphics stream (PID=0x1200) | Presentation graphics stream (PID=0x1201) | Interactive graphics stream (PID=0x1400) | Video stream (PID=0x1B00, Secondary video) | Video stream (PID=0x1B01, Secondary video) |

FIG. 25
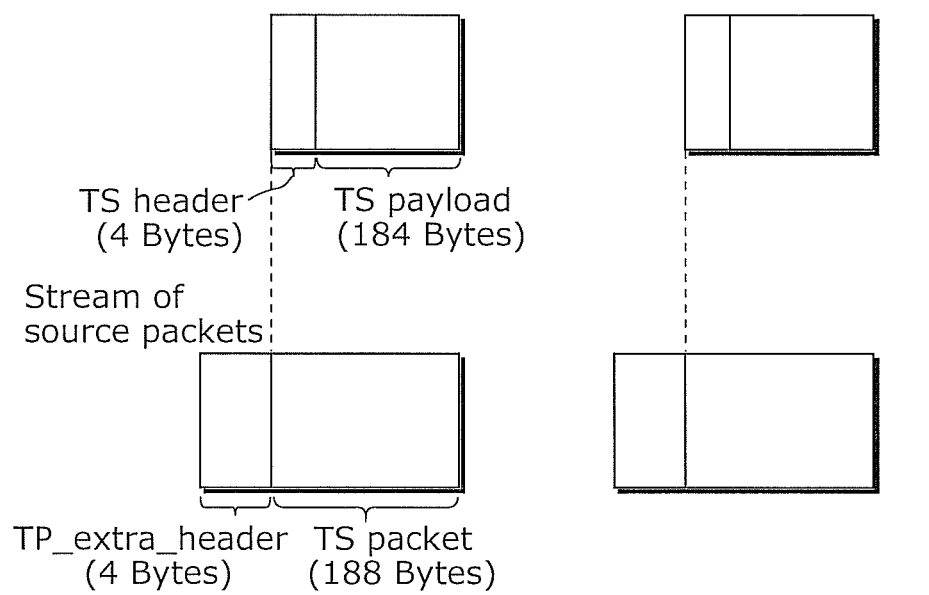
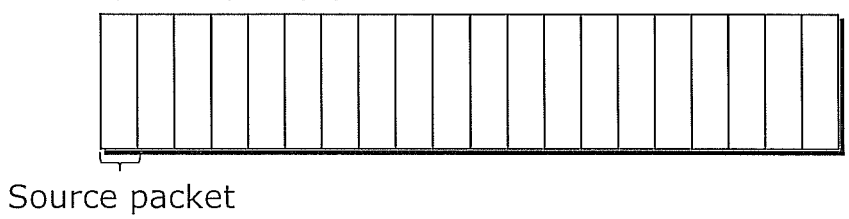

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD, MOVING PICTURE CODING APPARATUS, MOVING PICTURE DECODING METHOD, MOVING PICTURE DECODING APPARATUS, AND MOVING PICTURE CODING AND DECODING APPARATUS

CROSS REFERENCE TO RELATED APPLICATION

The present application claims the benefit of U.S. Provisional Patent Application No. 61/651,647 filed on May 25, 2012. The entire disclosure of the above-identified application, including the specification, drawings and claims is incorporated herein by reference in its entirety.

FIELD

The present disclosure relates to an apparatus and a method for coding or decoding a moving picture, and more specifically to arithmetic coding and arithmetic decoding of a quantization parameter.

BACKGROUND

Recent years have seen the significant technical development in digital video apparatuses, and increasing chances for compression-coding a video signal (a plurality of moving pictures arranged in time series) and recording the video signal onto recording media such as DVDs and hard disks or distributing the video signal on the Internet. For example, the H.264/AVC (MPEG-4 AVC) is one of the standards for compression-coding a video signal. Furthermore, the High Efficiency Video Coding (HEVC) standard is currently being studied as a next-generation standard.

The HEVC standard (NPL 1) currently being studied includes a syntax called cu_qp_delta. Here, cu_qp_delta is a syntax indicating a delta value between two quantization parameters to be used in quantizing moving picture coding processes and moving picture decoding processes. In the quantization, a quantization parameter is changed according to cu_qp_delta, and the quantization is performed according to the changed quantization parameter.

The delta value of cu_qp_delta between the two quantization parameters includes sign_flag (cu_qp_delta_sign, sign bit) and cu_qp_delta_abs. Here, sign_flag is a sign (parameter indicating positive or negative). Furthermore, cu_qp_delta_abs includes significant_flag indicating whether cu_qp_delta is 0 or not, and minus1 indicating an absolute value.

CITATION LIST

Non Patent Literature

Joint Collaborative Team on Video Coding (JCT-VC) of ITU-T SG16 WP3 and ISO/IEC JTC1/SC29/WG11, 8th Meeting: San José, Calif., USA, 1-10 Feb., 2012, JCTVC-H1003, Title: High efficiency video coding (HEVC) text specification draft 6, http://phenix.it-sudparis.eu/jct/doc_en-d_user/documents/8_San % 20Jose/wg11/JCTVC-H1003-v22.zip

SUMMARY

Technical Problem

In the conventional technique, accelerated processing is desired in coding and decoding an image.

The present disclosure provides a moving picture coding method and a moving picture decoding method in which the processing can be accelerated.

Solution to Problem

The moving picture coding method according to an aspect of the present disclosure is a moving picture coding method for performing arithmetic coding on a quantization parameter to be used in quantizing a current block that is to be coded and is included in a current picture to be coded, the quantization parameter including a parameter indicating a sign and a parameter indicating an absolute value, the method including: binarizing the parameter indicating the absolute value without requiring information on a maximum value of the absolute value; binarizing the parameter indicating the sign without requiring information on a maximum value of the sign; and performing bypass arithmetic coding, using a fixed probability, sequentially on (i) a latter half of the binarized parameter indicating the absolute value and (ii) the binarized parameter indicating the sign.

The moving picture decoding method according to an aspect of the present disclosure is a moving picture decoding method for performing arithmetic decoding on a coded quantization parameter to be used in inversely quantizing a current block that is to be decoded and is included in a current picture to be decoded, the coded quantization parameter sequentially including a coded parameter indicating an absolute value and a coded parameter indicating a sign, the method including: performing bypass arithmetic decoding, using a fixed probability, sequentially on (i) a latter half of the coded parameter indicating the absolute value and (ii) the coded parameter indicating the sign; inversely binarizing the decoded parameter indicating the absolute value without requiring information on a maximum value of the absolute value; and inversely binarizing the decoded parameter indicating the sign without requiring information on a maximum value of the sign.

These general or specific aspects of the present disclosure may be implemented by a system, an apparatus, an integrated circuit, a computer program, a computer-readable recording medium, such as a CD-ROM, or an arbitrary combination of the system, the apparatus, the integrated circuit, the computer program, and the recording medium.

Advantageous Effects

The moving picture coding method, the moving picture coding apparatus, the moving picture decoding method, the moving picture decoding apparatus, and the moving picture coding and decoding apparatus according to the present disclosure enables acceleration of processing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 is a table indicating an example correspondence between non-binary signals and bin strings in accordance with the truncated unary code.

FIG. 8 is a table indicating an example correspondence between non-binary signals and bin strings in accordance with the exponential Golomb code.

FIG. 9 is a table indicating an example of arithmetic coding to be applied to each bin of minus1_prefix.

FIG. 21B illustrates a block diagram of an example of a configuration of the cellular phone.

FIG. 22 illustrates a structure of multiplexed data.

FIG. 25 illustrates a structure of TS packets and source packets in the multiplexed data.

FIG. 33 illustrates an example of a look-up table in which the standards of video data are associated with the driving frequencies.

DESCRIPTION OF EMBODIMENTS

Embodiment 1

Figure 1:
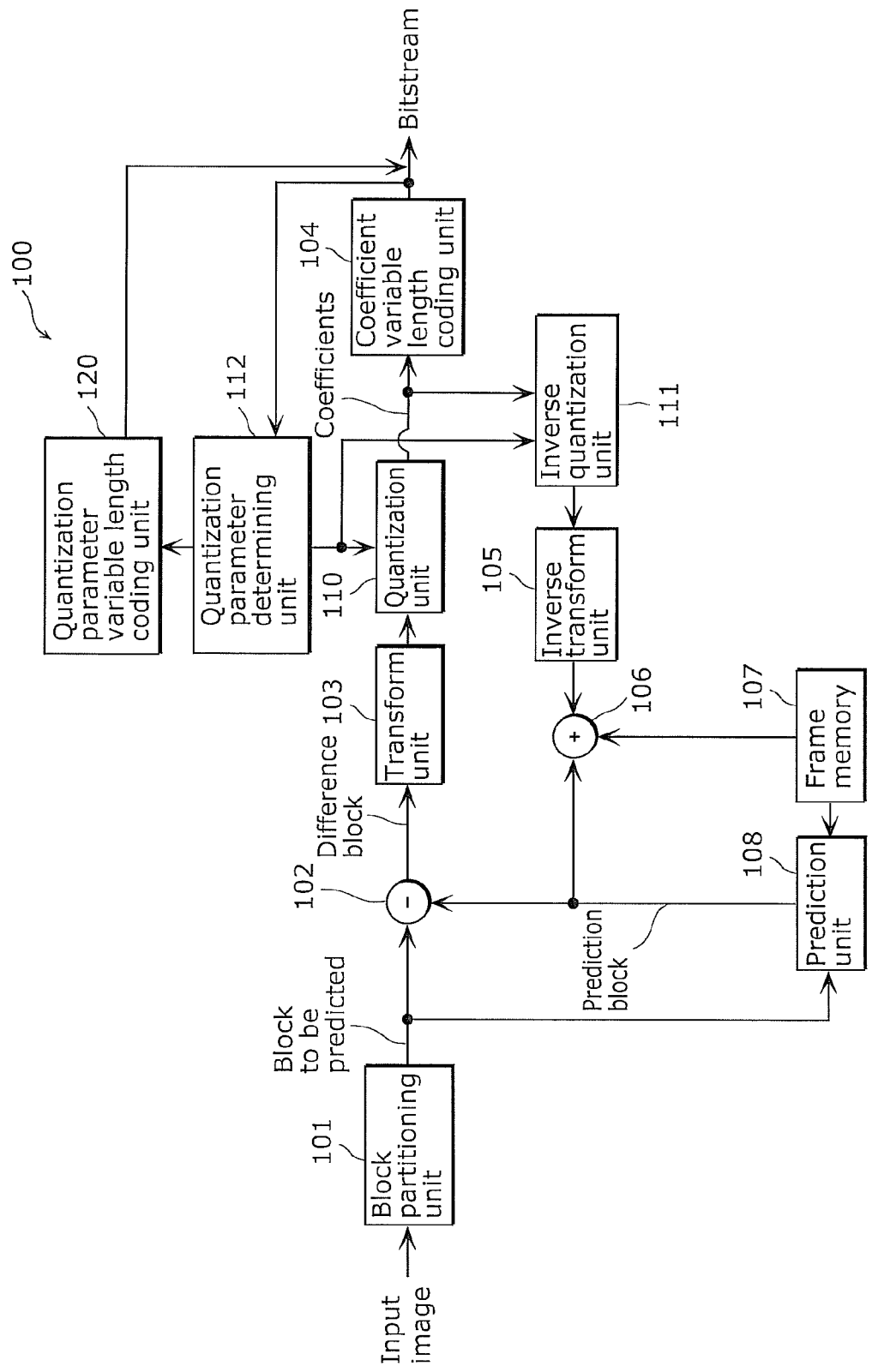
FIG. 1 is a block diagram illustrating an example configuration of a moving picture coding apparatus according to Embodiment 1.

(Underlying Knowledge Forming Basis of the Present Disclosure)

The Inventors have found that the moving picture coding method and others that are described in "Field" have the following problems.

The coding of a quantization parameter in accordance with the HEVC standard includes (1) binarization for converting a signal to be coded (for example, a delta value between two quantization parameters) from a non-binary signal to a bin string and (2) performing arithmetic coding on the bin string generated in the binarization.

(1) Binarization

The technique of the binarization includes, for example, (1-1) a truncated unary code and (1-2) an exponential Golomb code.

(1-1) In accordance with the truncated unary code, non-binary signals which indicate values other than the maximum value are generated by mapping consecutive "1"s whose number is equal to the value indicated by the non-binary signal and giving 0 to the last. The non-binary signal which indicates the maximum value is generated by pre-setting the maximum value and mapping consecutive "1"s whose number is equal to the value indicated by the non-binary signal (no 0 is given to the last).

(1-2) In accordance with the exponential Golomb code, for example, a non-binary signal is generated according to the number of consecutive "1"s and the subsequent value.

When the delta value (cu_qp_delta) between the two quantization parameters in accordance with the HEVC standard is binarized, the truncated unary code is used for cu_qp_delta_abs (absolute value of cu_qp_delta) in the parameter of the cu_qp_delta.

As described above, the maximum value of the bin string has to be preset in the binarization and the inverse binarization using the truncated unary code. However, the maximum value of cu_qp_delta_abs is changed according to information indicating positive or negative (value of a sign bit, that is, value of sign_flag). Thus, before performing the inverse binarization of cu_qp_delta_abs in the moving picture decoding processes, the sign bit (sign_flag) needs to be decoded.

In other words, the inverse binarization of cu_qp_delta_abs in the moving picture decoding processes has to be performed after the inverse binarization of sign_flag. Similarly, before binarizing cu_qp_delta_abs in the moving picture coding processes, sign_flag has to be binarized. Problems with the sequential processes and reduction in the throughput occur because of the dependency between the binarization of sign_flag, and the binarization of cu_qp_delta_abs, and the dependency between the inverse binarization of sign_flag and the inverse binarization of cu_qp_delta_abs.

(2) Arithmetic Coding

The arithmetic coding has two types: (1) context arithmetic coding in which arithmetic coding is performed using an adaptive symbol occurrence probability; and (2) bypass arithmetic coding in which arithmetic coding is performed by fixing a symbol occurrence probability to, for example, 50%.

(2-1) In the context arithmetic coding, a context is selected per signal to be coded. The symbol occurrence probability is determined according to the context. Furthermore, in the context arithmetic coding, the selected context is loaded, and the arithmetic coding is performed on the signal to be coded, based on a symbol occurrence probability corresponding to the loaded context. Furthermore, in the context arithmetic coding, the context updating process for updating the symbol occurrence probability (for example, probabilities of occurrence of 1) of the context is performed according to a value of the signal to be coded.

(2-2) In contrast, in the bypass arithmetic coding, arithmetic coding is performed on the signal to be coded by fixing the symbol occurrence probability to, for example, 50% without using any context. Thus, the bypass arithmetic coding does not require loading or updating the context.

In accordance with the HEVC standard, bypass arithmetic coding is performed on sign_flag, and context arithmetic coding is performed on cu_qp_delta_abs. Here, sign_flag and cu_qp_delta_abs are parameters included in cu_qp_delta. This is because the symbol occurrence probability of a bin string indicating minus1 probably has a bias in accordance with the HEVC standard (NPL 1). When the symbol occurrence probability has a bias, the coding efficiency can be regulated using the context arithmetic coding.

As described above, however, the context arithmetic coding requires processing, such as loading and updating the context. Furthermore, when a context identical to the context selected in performing the context arithmetic coding on a predetermined minus1 is selected in performing the context arithmetic coding on another minus1, until the completion of the context updating process on the minus1 for which the arithmetic coding has previously been started, the context arithmetic coding on the next minus1 cannot be started. Thus, problems with the sequential processes and reduction in the throughput occur.

In order to solve the problems, the moving picture coding method according to an aspect of the present disclosure is a moving picture coding method for performing arithmetic coding on a quantization parameter to be used in quantizing a current block that is to be coded and is included in a current picture to be coded, the quantization parameter including a parameter indicating a sign and a parameter indicating an absolute value, the method including: binarizing the parameter indicating the absolute value without requiring information on a maximum value of the absolute value; binarizing the parameter indicating the sign without requiring information on a maximum value of the sign; and performing bypass arithmetic coding, using a fixed probability, sequentially on (i) a latter half of the binarized parameter indicating the absolute value and (ii) the binarized parameter indicating the sign.

Since the bypass arithmetic coding using a fixed probability is performed on the latter half of cu_qp_delta_abs that is the parameter indicating the absolute value and on sign_flag indicating the sign in accordance with the moving picture coding method, the processing can be accelerated.

Furthermore, in accordance with the moving picture coding method, binarization without requiring any information on the maximum value eliminates the need for binarizing the parameter indicating the sign before binarizing the parameter indicating the absolute value. Accordingly, the order of binarizing cu_qp_delta_abs and sign_flag can be replaced with one another. Furthermore, the order of binarizing cu_qp_delta_abs and sign_flag is replaced so that syntaxes to which the bypass arithmetic coding is applied are grouped, which enables parallel processing and acceleration of the processing speed.

In the moving picture coding method of the above structure, the quantization parameter is not limited to the quantization parameter itself but may be a parameter corresponding to the quantization parameter, such as a delta value between two quantization parameters.

Furthermore, for example, an exponential Golomb code may be used for binarizing the latter half of the parameter indicating the absolute value.

In accordance with the moving picture coding method, binarization using the exponential Golomb code that does not require information on the maximum value eliminates the need for binarizing sign_flag before binarizing cu_qp_delta_abs. Accordingly, the order of binarizing cu_qp_delta_abs and sign_flag can be replaced with one another.

Furthermore, for example, the arithmetic coding of the quantization parameter may be arithmetic coding of a delta value between a quantization parameter of a block to be coded immediately before the current block and the quantization parameter of the current block.

In the moving picture coding method, the parameter to be binarized and on which the arithmetic coding is to be performed is a delta value between two quantization parameters (cu_qp_delta). Here, cu_qp_delta is the delta value and has typically a smaller value. Thus, when the order of the binarization and the arithmetic coding is replaced with one another, the required memory amount can be controlled.

The moving picture decoding method according to an aspect of the present disclosure is a moving picture decoding method for performing arithmetic decoding on a coded quantization parameter to be used in inversely quantizing a current block that is to be decoded and is included in a current picture to be decoded, the coded quantization parameter sequentially including a coded parameter indicating an absolute value and a coded parameter indicating a sign, the method including: performing bypass arithmetic decoding, using a fixed probability, sequentially on (i) a latter half of the coded parameter indicating the absolute value and (ii) the coded parameter indicating the sign; inversely binarizing the decoded parameter indicating the absolute value without requiring information on a maximum value of the absolute value; and inversely binarizing the decoded parameter indicating the sign without requiring information on a maximum value of the sign.

Since the bypass arithmetic coding is performed on the latter half of cu_qp_delta_abs and sign_flag in accordance with the moving picture decoding method, the processing can be accelerated in the same manner as the moving picture coding method.

In other words, in accordance with the moving picture decoding method, the inverse binarization without requiring any information on the maximum value eliminates the need for inversely binarizing the parameter indicating the sign before inversely binarizing the parameter indicating the absolute value. Accordingly, the bitstream in which sign_flag is subsequent to cu_qp_delta_abs can be inversely binarized. Furthermore, since processing on the bitstream in which the syntax to which the bypass arithmetic coding is to be applied is standardized, the parallel processing can be performed and the processing speed can be increased.

In the moving picture decoding method of the above structure, the quantization parameter is not limited to the quantization parameter itself but may be a parameter corresponding to the quantization parameter, such as a delta value between two quantization parameters.

Furthermore, for example, an exponential Golomb code may be used for inversely binarizing the latter half of the coded parameter indicating the absolute value.

In accordance with the moving picture decoding method, the inverse binarization using the exponential Golomb code that does not require any information on the maximum value enables the inverse binarization on the bitstream in which cu_qp_delta_abs is prior to sign_flag.

Furthermore, for example, the arithmetic decoding of the coded quantization parameter may be arithmetic decoding of a delta value between a quantization parameter of a block to be decoded immediately before the current block and the quantization parameter of the current block.

In the moving picture decoding method, the parameter to be inversely binarized and on which the arithmetic coding is to be performed is a delta value between two quantization parameters (cu_qp_delta). Here, cu_qp_delta is a delta value and has typically a smaller value. Thus, the memory amount can be controlled in the bitstream in which cu_qp_delta_abs is prior to sign_flag and is processed earlier than sign_flag.

The moving picture coding apparatus according to an aspect of the present disclosure is a moving picture coding apparatus including control circuitry and storage accessible from the control circuitry, wherein the control circuitry executes the moving picture coding method.

The moving picture decoding apparatus according to an aspect of the present disclosure is a moving picture decoding apparatus including control circuitry and storage accessible from the control circuitry, wherein the control circuitry executes the moving picture decoding method.

The moving picture coding and decoding apparatus according to an aspect of the present disclosure is a moving picture coding and decoding apparatus including control circuitry and storage accessible from the control circuitry, wherein the control circuitry executes the moving picture coding method, the coded quantization parameter sequentially includes a coded parameter indicating an absolute value and a coded parameter indicating a sign, and the control circuitry further executes: performing bypass arithmetic decoding, using a fixed probability, sequentially on (i) a latter half of the coded parameter indicating the absolute value and (ii) the coded parameter indicating the sign; inversely binarizing the decoded parameter indicating the absolute value without requiring information on a maximum value of the absolute value; and inversely binarizing the decoded parameter indicating the sign without requiring information on a maximum value of the sign.

These general or specific aspects of the present disclosure may be implemented by a system, an integrated circuit, a computer program, a computer-readable recording medium, such as a CD-ROM, or an arbitrary combination of the system, the method, the integrated circuit, the computer program, and the recording medium.

Embodiments on, for example, the moving picture coding method, the moving picture coding apparatus, the moving picture decoding method, and the moving picture decoding apparatus will be hereinafter described with reference to the drawings.

Embodiments described hereinafter indicate specific or generic examples of the present disclosure. The values, shapes, materials, constituent elements, positions and connections of the constituent elements, steps, and orders of the steps indicated in Embodiments are examples, and do not limit the present disclosure. The constituent elements in Embodiments that are not described in independent Claims that describe the most generic concept of the present disclosure are described as arbitrary constituent elements.

(Embodiment 1)

A moving picture coding apparatus and a moving picture coding method according to Embodiment 1 will be described with reference to FIGS. 1 to 9.

<1-1. Overall Configuration of Apparatus>

A moving picture coding apparatus 100 according to Embodiment 1 will be described with reference to FIG. 1. FIG. 1 is a block diagram illustrating a configuration of the moving picture coding apparatus 100 according to Embodiment 1.

The moving picture coding apparatus 100 is an apparatus that codes an image to be input (input image) per block to generate a bitstream (coded bitstream).

As illustrated in FIG. 1, the moving picture coding apparatus 100 includes a block partitioning unit 101, a subtracting unit 102, a transform unit 103, a quantization unit 110, a variable length coding unit 104, an inverse quantization unit 111, an inverse transform unit 105, an adding unit 106, a frame memory 107, a prediction unit 108, a quantization parameter determining unit 112, and a quantization parameter variable length coding unit 120. Here, the block partitioning unit 101, the subtracting unit 102, the transform unit 103, the quantization unit 110, the variable length coding unit 104, the inverse quantization unit 111, the inverse transform unit 105, the adding unit 106, the prediction unit 108, the quantization parameter determining unit 112, and the quantization parameter variable length coding unit 120 are examples of circuits included in control circuitry.

The block partitioning unit 101 partitions the input image into blocks to be predicted and each including pixels. The blocks to be predicted are blocks variable in size. For example, the minimum size of the blocks is 4×4 pixels, and the maximum size of the blocks is 32×32 pixels. The minimum and maximum sizes of the blocks may be others. The input image is partitioned according to features of an image.

The subtracting unit 102 subtracts, from each of the blocks to be predicted, a prediction block predicted by the prediction unit 108 to be described later to calculate a difference block.

The transform unit 103 transforms the difference block from an image domain to a frequency domain to derive frequency coefficients.

The quantization parameter determining unit 112 determines a quantization parameter to be used in the quantization.

The quantization unit 110 quantizes the frequency coefficients according to the quantization parameter determined by the quantization parameter determining unit 112 to generate quantized coefficients. In the quantization according to Embodiment 1, the frequency coefficients are transformed into the quantized coefficients using a quantization matrix and the quantization parameter determined by the quantization parameter determining unit 112.

The inverse quantization unit 111 inversely quantizes the quantized coefficients according to the quantization parameter determined by the quantization parameter determining unit 112 to generate the frequency coefficients.

The inverse transform unit 105 inversely transforms the frequency coefficients output from the inverse quantization unit 111 from the frequency domain to the image domain to generate a reconstructed difference block.

The adding unit 106 adds the prediction block predicted by the prediction unit 108 to be described later, to the reconstructed difference block derived by the inverse transform unit 105 to generate a reconstructed block.

The quantization parameter variable length coding unit 120 performs variable length coding on the quantization parameter determined by the quantization parameter determining unit 112 to output a bitstream.

According to Embodiment 1, the quantization parameter variable length coding unit 120 performs variable length coding on cu_qp_delta that is a delta value between two quantization parameters. The delta value is a parameter corresponding to a quantization parameter. Furthermore, the variable length coding herein includes the binarization and the arithmetic coding.

As described above, the delta value between two quantization parameters includes three syntaxes of significant_flag, minus1, and sign_flag. significant_flag is a flag indicating whether or not the delta value between two quantization parameters is 0. When the value is 0, the flag indicates that the delta value is 0, whereas when the value is 1, the flag indicates that the delta value is other than 0. minus1 is only included in the delta value between two quantization parameters whose significant_flag is 1 (whose absolute value is 1 or higher), and is set to a value obtained by subtracting 1 from cu_qp_delta_abs that is an absolute value of the delta value between two quantization parameters. sign_flag is only included in the delta value between two quantization parameters whose significant_flag is 1 (delta value between two quantization parameters that are not 0), and is a flag indicating whether the quantization parameters are positive values or negative values. The flag indicating 0 means that the delta value between two quantization parameters is a positive value, whereas the flag indicating 1 means that the delta value between two quantization parameters is a negative value.

Figure 2:
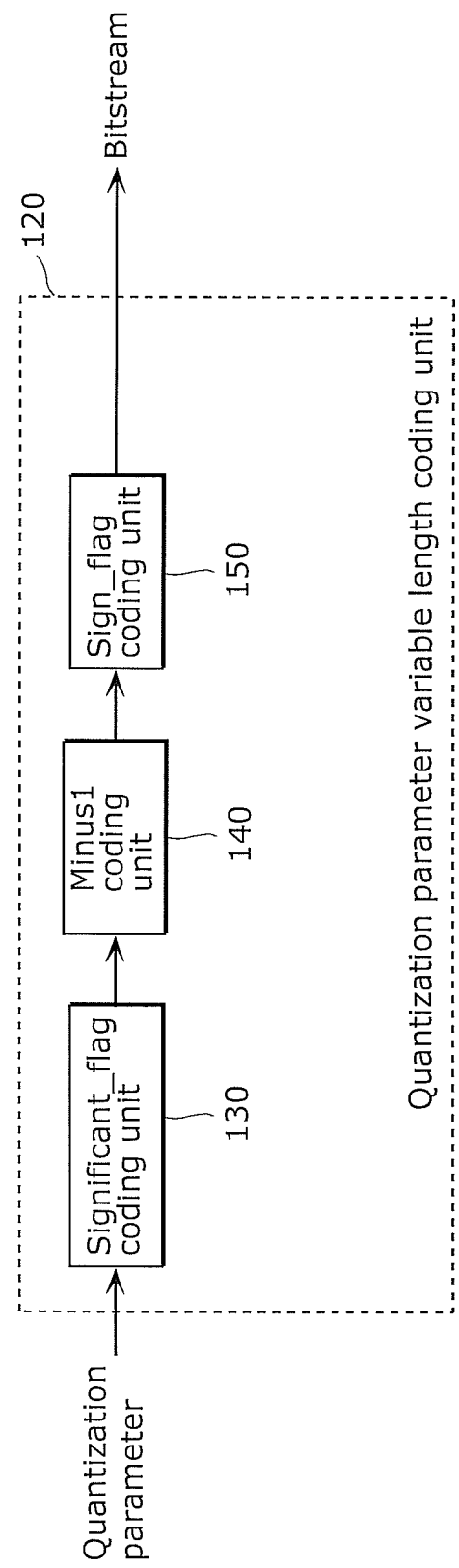
FIG. 2 is a block diagram illustrating an example configuration of a quantization parameter variable length coding unit.

FIG. 2 is a block diagram illustrating an example configuration of the quantization parameter variable length coding unit 120. As illustrated in FIG. 2, the quantization parameter variable length coding unit 120 includes a significant_flag coding unit 130, a minus1 coding unit 140, and a sign_flag coding unit 150.

The significant_flag coding unit 130 binarizes and performs arithmetic coding on significant_flag. The significant_flag coding unit 130 performs binarization using the truncated unary code, and context arithmetic coding according to Embodiment 1.

The minus1 coding unit 140 binarizes and performs arithmetic coding on minus1. Specifically, the minus1 coding unit 140 performs context arithmetic coding on the first half of bins included in the minus1 (the bins included in a bin string), and performs, on the latter half of the bins, binarization using the exponential Golomb code and bypass arithmetic coding.

Figure 3:
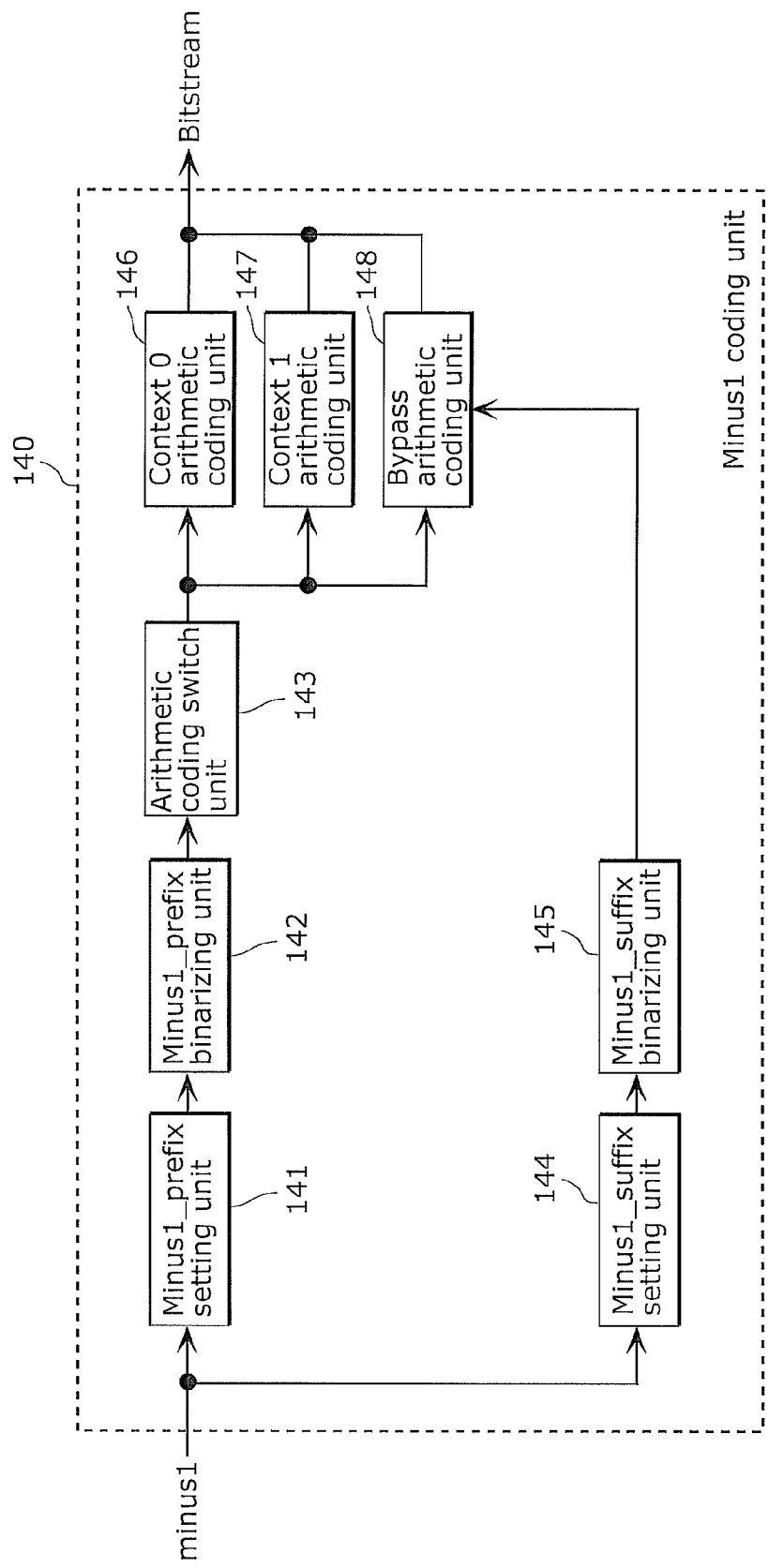
FIG. 3 is a block diagram illustrating an example configuration of a minus1 coding unit.

FIG. 3 is a block diagram illustrating an example configuration of the minus1 coding unit 140. According to Embodiment 1, minus1 is coded by dividing it into the first half of minus1_prefix and the latter half of minus1_suffix.

FIG. 3 is a block diagram illustrating an example configuration of the minus1 coding unit 140. As illustrated in FIG. 3, the minus1 coding unit 140 includes a minus1_prefix setting unit 141, a minus1_prefix binarizing unit 142, an arithmetic coding switch unit 143, a minus1_suffix setting unit 144, a minus1_suffix binarizing unit 145, a context 0 arithmetic coding unit 146, a context 1 arithmetic coding unit 147, and a bypass arithmetic coding unit 148.

The minus1_prefix setting unit 141 sets minus1_prefix. The maximum value is set to minus1_prefix. When the value of minus1 is larger than the maximum value of minus1_prefix, the minus1_prefix setting unit 141 sets the maximum value to minus1_prefix. When the value of minus1 is smaller than or equal to the maximum value, the minus1_prefix setting unit 141 sets the value of minus1 to minus1_prefix.

The minus1_prefix binarizing unit 142 converts minus1_prefix from a non-binary signal to a bin string.

The arithmetic coding switch unit 143 outputs each bin included in minus1_prefix to one of the context 0 arithmetic coding unit 146, the context 1 arithmetic coding unit 147, and the bypass arithmetic coding unit 148, according to a binIdx indicating the position of the bin.

The minus1_suffix setting unit 144 sets minus1_suffix. When the value of minus1 is larger than the maximum value of minus1_prefix, the minus1_suffix setting unit 144 sets, to minus1_suffix, a value obtained by subtracting the maximum value from minus1. When the value of minus1 is smaller than or equal to the maximum value of minus1_prefix, the minus1_suffix setting unit 144 does not set any value to minus1_suffix (NULL may be set).

When a value is set to minus1_suffix, the minus1_suffix binarizing unit 145 binarizes minus1_suffix using the exponential Golomb code.

The context 0 arithmetic coding unit 146 performs context arithmetic coding using the context 0.

The context 1 arithmetic coding unit 147 performs context arithmetic coding using the context 1.

The bypass arithmetic coding unit 148 performs bypass arithmetic coding.

The sign_flag coding unit 150 binarizes and performs arithmetic coding on sign_flag. The sign_flag coding unit 150 performs binarization using the exponential Golomb code, and bypass arithmetic coding.

The variable length coding unit (entropy coding unit) 104 performs entropy coding on the quantized coefficients output from the quantization unit 110 and on various information necessary for decoding (partitioning information for the blocks to be predicted, a type of prediction, a motion vector, and a prediction mode (intra prediction mode, etc.) to generate a bitstream.

The frame memory 107 includes a memory, such as a Random Access Memory (RAM) and a Read Only Memory (ROM).

The prediction unit 108 generates a prediction block through inter prediction or intra prediction. In inter prediction, the prediction unit 108 derives a motion vector using a block to be predicted, and generates a prediction block using the derived motion vector and the reconstructed block obtained in the SAO process and stored in the frame memory 107. In intra prediction, the prediction unit 108 generates a prediction block using the reconstructed block obtained in the SAO process and stored in the frame memory 107, according to a prediction mode.

<1-2. Overall Operations>

Figure 4:
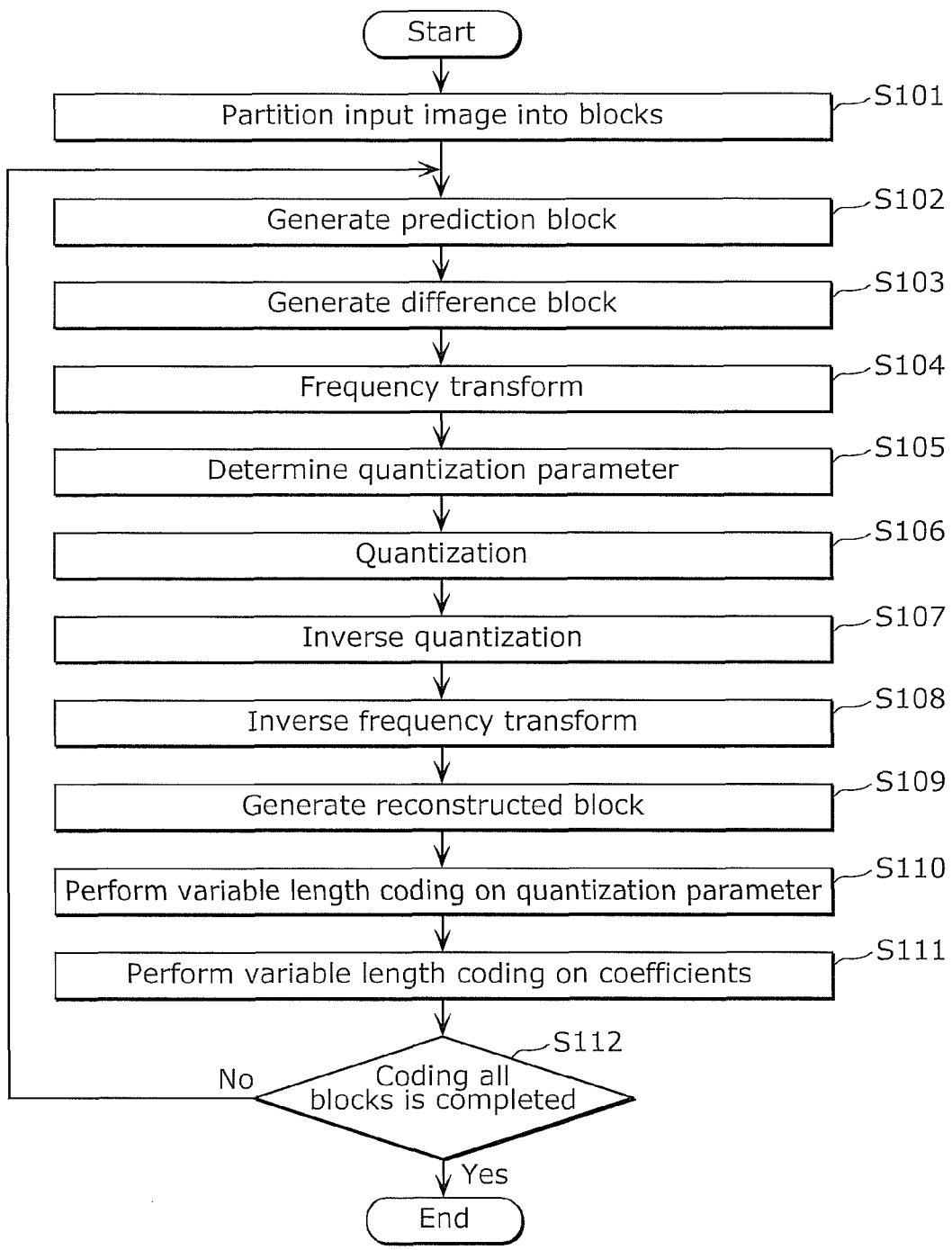
FIG. 4 is a flowchart indicating example processes performed by a moving picture coding apparatus.

Next, operations of the moving picture coding apparatus 100 will be described with reference to FIG. 4. FIG. 4 is a flowchart indicating the procedure of the moving picture coding apparatus 100.

The block partitioning unit 101 partitions an input image into blocks to be predicted, and successively outputs the blocks to the subtracting unit 102 and the prediction unit 108

(S101). The blocks to be predicted are variable in size according to Embodiment 1. The input image is partitioned according to features of an image. The minimum size of the blocks to be predicted is horizontal 4 pixels×vertical 4 pixels according to Embodiment 1. Furthermore, the maximum size of the blocks to be predicted is horizontal 32 pixels× vertical 32 pixels according to Embodiment 1.

The prediction unit 108 generates a prediction block using the blocks to be predicted and the reconstructed block stored in the frame memory 107 (S102).

The subtracting unit 102 subtracts the prediction block from each of the blocks to be predicted to generate a difference block (S103).

The transform unit 103 transforms the difference block from an image domain to a frequency domain to generate frequency coefficients (S104).

The quantization parameter determining unit 112 determines a quantization parameter. The value of the quantization parameter is calculated using the bit quantity of a bitstream previously generated or a feature amount of an image (S105).

The quantization unit 110 quantizes the frequency coefficients according to the quantization parameter determined by the quantization parameter determining unit 112 (S106).

The inverse quantization unit 111 inversely quantizes the frequency coefficients on which the quantization has been performed (quantized coefficients), according to the quantization parameter determined by the quantization parameter determining unit 112 to generate the frequency coefficients (S107).

The inverse transform unit 105 transforms the frequency coefficients generated by the inverse quantization from the frequency domain to the image domain to generate a reconstructed difference block obtained by reconstructing the difference block (S108).

The adding unit 106 adds the prediction block to the reconstructed difference block to generate a reconstructed block (S109).

The quantization parameter variable length coding unit 120 performs variable length coding on the quantization parameter to output a bitstream (S110). More specifically, according to Embodiment 1, the quantization parameter variable length coding unit 120 performs variable length coding on cu_qp_delta that is a delta value between two quantization parameters. The delta value is a parameter corresponding to a quantization parameter. Furthermore, the variable length coding herein includes the binarization and the arithmetic coding.

The variable length coding unit 104 performs variable length coding on the quantized coefficients output from the quantization unit 110 to generate a bitstream (S111).

The moving picture coding apparatus 100 repeatedly performs Steps S102 to S111 until completion of coding all the blocks to be predicted of the input image.

<1-2-1. Operations of the Quantization Parameter Variable Length Coding Unit 120>

Figure 5:
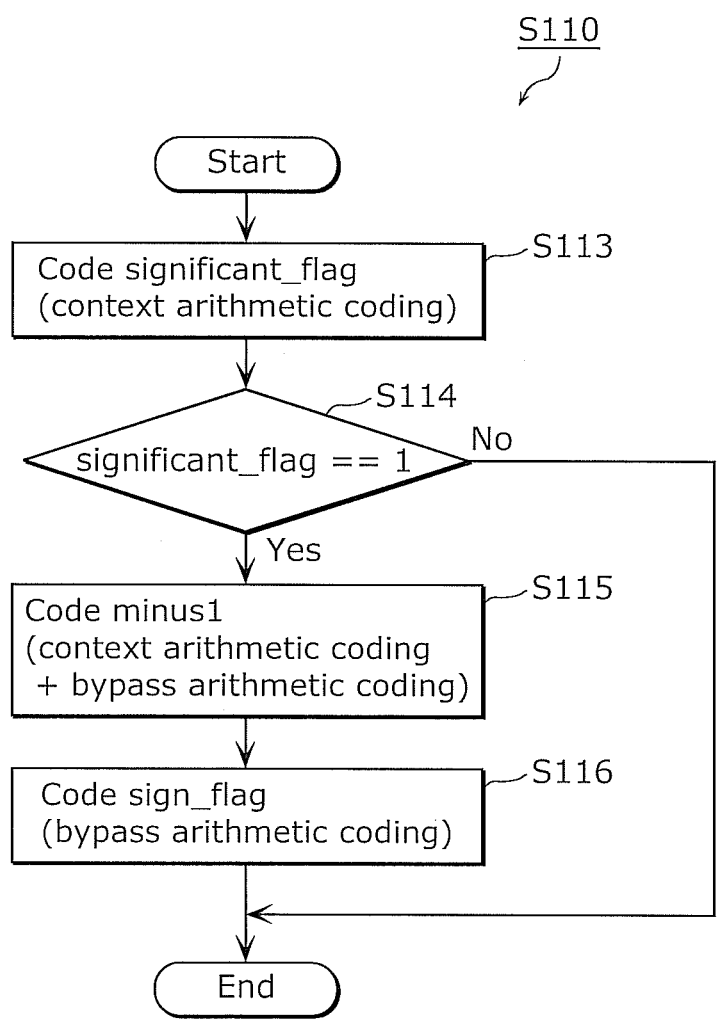
FIG. 5 is a flowchart indicating example processes performed by the quantization parameter variable length coding unit.

The operations of the quantization parameter variable length coding unit 120 according to Embodiment 1 will be described with reference to FIG. 5. FIG. 5 is a flowchart indicating an example process (S110) performed by the quantization parameter variable length coding unit 120.

The significant_flag coding unit 130 of the quantization parameter variable length coding unit 120 codes significant_flag (S113). Furthermore, the coding herein includes the binarization and the arithmetic coding. In the arithmetic coding, context arithmetic coding is performed using the context 0.

When significant_flag indicates 1 (Yes at S114), the quantization parameter variable length coding unit 120 proceeds to Step S115. When significant_flag indicates 0 (No at S114), the quantization parameter variable length coding unit 120 ends the coding of the delta value between the current quantization parameters because of no minus1 and no sign_flag.

The minus1 coding unit 140 codes minus1 (S115). The minus1 coding unit 140 performs context arithmetic coding on the first half of bins included in the minus1, and performs bypass arithmetic coding on the latter half of the bins. The details will be described later.

The sign_flag coding unit 150 codes sign_flag (S116). The sign_flag coding unit 150 performs context arithmetic coding herein.

<1-2-2. Operations of the Minus1 Coding Unit 140>

Figure 6:
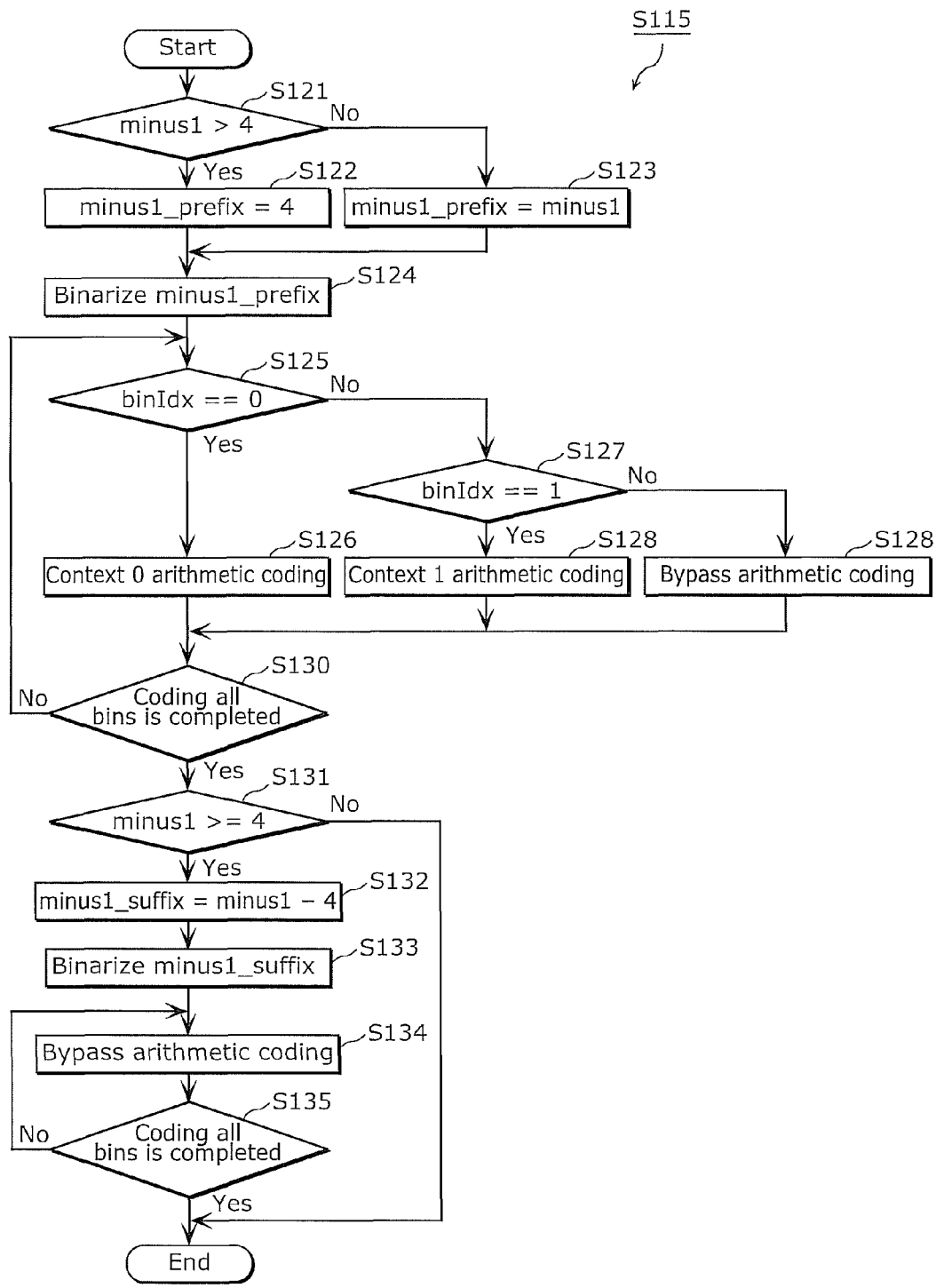
FIG. 6 is a flowchart indicating example processes performed by the minus1 coding unit.

The operations of the minus1 coding unit 140 according to Embodiment 1 will be described with reference to FIG. 6. FIG. 6 is a flowchart indicating an example process (S115) performed by the minus1 coding unit 140.

The minus1_prefix setting unit 141 sets minus1_prefix (S121 to S123). The case where the minus1_prefix setting unit 141 sets 4 as the maximum value of minus1_prefix will be exemplified according to Embodiment 1.

More specifically, when minus1 is larger than 4 (Yes at Step S121), the minus1_prefix setting unit 141 sets 4 to minus1_prefix. When minus1 is smaller than or equal to 4 (No at Step S121), the minus1_prefix setting unit 141 sets the value of minus1 to minus1_prefix. Thus, a smaller one of minus1 and 4 is set to minus1_prefix at Step S121.

The minus1_prefix binarizing unit 142 converts minus1_prefix from a non-binary signal to a bin string.

FIG. 7 is a table indicating an example correspondence between non-binary signals and bin strings in accordance with the truncated unary code.

As indicated in FIG. 7, in accordance with the truncated unary code, the consecutive number of "1"s from the first bin of a bin string is equal to the value of the non-binary signal and 0 is "0" is given to the last, other than the maximum value of the non-binary signals. Furthermore, when the maximum value is 4, the consecutive number of "1"s from the first bin is four and no "0" is given to the last. Here, the binIdx is an index indicating the position of a bin included in a bin string, and the first value is 0 and the subsequent values are incremented by 1.

After performing binarization, the minus1_prefix binarizing unit 142 sequentially outputs bins from the bin whose binIdx is 0 to the arithmetic coding switch unit 143.

The arithmetic coding switch unit 143 transmits each of the bins included in the bin string to one of the three arithmetic coding units, according to the value of the binIdx (S125, S127, and S130).

More specifically, when the binIdx is 0 (Yes at S125), the arithmetic coding switch unit 143 outputs the bin to the context 0 arithmetic coding unit 146. The context 0 arithmetic coding unit 146 performs context arithmetic coding on the bin whose binIdx is 0, using the context 0 (S126).

When the binIdx is 1 (No at S125 and Yes at S127), the arithmetic coding switch unit 143 outputs the bin to the context 1 arithmetic coding unit 147. The context 1 arithmetic coding unit 147 performs context arithmetic coding on the bin whose binIdx is 1, using the context 1 (S128).

When the binIdx is neither 0 nor 1 (No at S125 and No at S127), the arithmetic coding switch unit 143 outputs the bin to the bypass arithmetic coding unit 148. The bypass arithmetic coding unit 148 performs bypass arithmetic coding on the bin whose binIdx is other than 0 and 1 (S129). Since the bypass arithmetic coding unit 148 does not use any context, the contexts used according to Embodiment 1 are of two types. Steps S125 to S130 are repeatedly performed on each bin until the completion of the processes on all of the bins (S130).

The minus1_suffix setting unit 144 determines whether minus1 (non-binary value) is 4 or larger (S131). When the minus1 is 4 or larger (Yes at S131), the minus1_suffix setting unit 144 proceeds to Step S132. When the minus1 is smaller than 4 (No at S131), the minus1_suffix setting unit 144 ends the coding of the minus1 because of no minus1_suffix.

The minus1_suffix setting unit 144 sets, to minus1_suffix, a value obtained by subtracting 4 from minus1 (S132).

The minus1_suffix binarizing unit 145 converts minus1_suffix from a non-binary signal to a bin string (bin) using the exponential Golomb code (S133). FIG. 8 is a table indicating a correspondence between non-binary signals and bin strings in accordance with the exponential Golomb code. As indicated in FIG. 8, the non-binary signal includes the first half of consecutive "1"s and the latter half of a binary number in accordance with the exponential Golomb code.

After performing binarization, the minus1_suffix binarizing unit 145 sequentially outputs bins from the bin whose binIdx is 0, to the bypass arithmetic coding unit 148.

The bypass arithmetic coding unit 148 performs bypass arithmetic coding on the input bin (S134).

The minus1 coding unit 140 repeatedly performs Steps S134 and S135 on each of the bins until the completion of the processes on all of the bins (S135).

<1-3. Advantages>

The moving picture coding apparatus 100 according to Embodiment 1 does not require information on the maximum value of a parameter indicating an absolute value because the exponential Golomb code is used for binarizing the latter half of the parameter indicating the absolute value and included in a parameter of a delta value between two quantization parameters. In other words, there is no need (dependency) to binarize sign_flag indicating a sign before binarizing the latter half of the parameter indicating the absolute value, thus achieving acceleration of the processing.

More specifically, according to Embodiment 1, minus1 that is a quantization parameter is divided into minus1_prefix and minus1_suffix, and the exponential Golomb code is used for binarizing minus1_suffix. Accordingly, there is no need to set the maximum value beforehand, the dependency on sign_flag can be eliminated, and thus the moving picture decoding can be accelerated. As a postscript of the accelerated processing, the conventional moving picture decoding apparatus cannot start decoding minus1 unless decoding sign_flag is completed. However, the moving picture decoding apparatus according to Embodiment 1 can start decoding minus1 before completion of decoding sign_flag because of no dependency on the sign_flag.

Here, since cu_qp_delta that is a delta value between two quantization parameters is typically a smaller value in many cases, the truncated unary code is used for binarizing minus1_prefix and the exponential Golomb code is used for binarizing minus1_suffix.

Although all the absolute values are binarized using the truncated unary code in consideration that cu_qp_delta is typically a smaller value in many cases, the experiment of the binarization using both of the truncated unary code and the exponential Golomb code has revealed that the coding efficiency is hardly degraded.

Furthermore, the moving picture coding apparatus 100 according to Embodiment 1 performs bypass arithmetic coding on the latter half of the bins of minus1. Accordingly, the processing can be accelerated.

More specifically, the moving picture coding apparatus 100 according to Embodiment 1 performs not the context arithmetic coding but the bypass arithmetic coding on bins whose binIdx is 2 or larger in minus1_prefix. Furthermore, the moving picture coding apparatus 100 also performs not the context arithmetic coding but the bypass arithmetic coding on all the bins of minus1_suffix. As described above, the bypass arithmetic coding does not require loading or updating any context. Since the processing can be started without waiting for the completion of the previous arithmetic coding, a plurality of arithmetic coding processes can be performed in the same manner and the processing can be accelerated more than the context arithmetic coding that is sequential processing.

The reason why the conventional moving picture coding apparatus applies the context arithmetic coding for performing arithmetic coding on minus1 is because symbol occurrence probabilities (probabilities of occurrence of 1) of respective bins of minus1 have a bias in accordance with the current HEVC standard (NPL 1). With the bias in the symbol occurrence probabilities, the coding efficiency typically decreases in the bypass arithmetic coding. In order to maintain the coding efficiency, the context arithmetic coding is conventionally used for performing the arithmetic coding on minus1.

However, the Inventors have found that the coding efficiency is hardly degraded as a result of the experiment of the bypass arithmetic coding by fixing the symbol occurrence probability of the latter half of bins to 50%. In other words, the Inventors have found that the coding efficiency is hardly degraded from the experiment when arithmetic coding is performed on minus1 using not the context arithmetic coding but the bypass arithmetic coding. Thus, processing can be accelerated by regulating the coding efficiency, using the bypass arithmetic coding.

Furthermore, since the number of bins is equal to the number of bits in a bitstream and a context is neither loaded nor updated in the bypass arithmetic coding, the processing can be further accelerated by arranging the consecutive bins to which the bypass arithmetic coding is applied. Thus, sign_flag to which the bypass arithmetic coding is applied is placed immediately subsequent to minus1 having the latter half to which the bypass arithmetic coding is applied according to Embodiment 1. Accordingly, arranging the consecutive bins to which the bypass arithmetic coding is applied further enables acceleration of the processing. According to Embodiment 1, the bypass arithmetic coding is applied to the latter half of minus1_prefix, minus1_suffix, and sign_flag, which are consecutively arranged.

When arithmetic coding is performed in an order of cu_qp_delta_abs and sign_flag by changing the order of arithmetic coding on cu_qp_delta (that is, cu_qp_delta_abs is first coded), the value of cu_qp_delta_abs has to be stored in a memory. Thus, the necessary memory capacity increases. However, since the value of cu_qp_delta_abs is often smaller, the memory does not need much capacity.

According to Embodiment 1, parameters included in a bitstream are minus1_suffix and sign_flag in this order after performing the arithmetic coding. The binarization does not necessarily have to be performed in the order of minus1_suffix and sign_flag.

<1-4. Variations and Others>

(1) Although the moving picture coding apparatus 100 according to Embodiment 1 performs bypass arithmetic coding on binIdx2 and after in minus1_prefix, the processing is not limited to such. The first half to which the context arithmetic coding is to be applied and the latter half to which the bypass arithmetic coding is to be applied may be set to minus1 in any method. For example, (Change 1) the context arithmetic coding may be performed on the bin whose binIdx is 0 in minus1_prefix, and the bypass arithmetic coding may be performed on the bins whose binIdx is 1 or larger in minus1_prefix. Alternatively, for example, (Change 2) the bypass arithmetic coding may be performed on all the bins included in minus1_prefix.

FIG. 9 is a table indicating example arithmetic coding to be applied to each bin of minus1_prefix. In FIG. 9, "Embodiment 1" indicates targets to which the context arithmetic coding and the bypass arithmetic coding are to be applied according to Embodiment 1. "Change 1" indicates a case where the bypass arithmetic coding is to be applied to binIdx1 and after, and "Change 2" indicates a case where the bypass arithmetic coding is to be applied to all the bins. Here, the context arithmetic coding may be applied to the bin of binIdx2, and the bypass arithmetic coding may be applied to binIdx3 and after.

Furthermore, the quantization parameter according to Embodiment 1 may be a syntax referred to as cu_qp_delta in accordance with the current HEVC standard, and a value itself of a quantization scale to be used in the quantization. The quantization parameter has only to be a value corresponding to the quantization parameter.

Furthermore, although Embodiment 1 describes a case where the quantization parameter includes three of significant_flag, minus1, and sign_flag, the quantization parameter is not limited to such. The quantization parameter may further include, for example, greater1_flag indicating one of 1 and 2 or larger.

(2) Although the quantization parameter is coded per block to be predicted according to Embodiment 1, the processing is not limited to such. The quantization parameter may be coded per block smaller than the block to be predicted, and conversely coded per block including blocks to be predicted. Furthermore, without coding quantization parameters of all the blocks to be predicted, a value of a quantization parameter of another block to be predicted may be copied and used for a part of the blocks to be predicted as a value of a quantization parameter of the block to be predicted.

(3) Furthermore, although minus1_prefix ranges from 0 to 4, the values are not limited to such. For example, minus1_prefix may range from 0 to 3 or from 0 to 5. Here, the value of minus1_suffix is also changed.

(4) Furthermore, although minus1 is coded by dividing it into minus1_prefix and minus1_suffix, the processing is not limited to such. Alternatively, minus1 may be entirely coded using the exponential Golomb code without having minus1_prefix. Furthermore, the binarization does not have to rely on the technique of the exponential Golomb code. As long as the binarization does not require setting the maximum value, other binarization techniques may be used, such as the unary code.

(5) Furthermore, not limited to quantization parameters but the method according to Embodiment 1 and a common variable length coding unit may be used for other syntaxes that are to be applied to a bitstream. For example, in accordance with the current HEVC standard (NPL 1), a parameter indicating a sign for a motion vector or an offset of SAO (sao_offset) is placed immediately after the latter half of the bins included in a parameter indicating an absolute value to concatenate the bins to which the bypass arithmetic coding is to be performed. The consecutive bins to which the bypass arithmetic coding is to be performed for enabling the simultaneous parallel processing can accelerate the processing.

Furthermore, the common variable length coding unit can be used by standardizing the technique of the arithmetic coding and the method for changing the order of parameters, and by using the same binIdx to which the context arithmetic coding is to be performed. Accordingly, the configuration of the moving picture coding apparatus can be simplified.

(6) Although the maximum size of the blocks to be predicted is 32×32 pixels and the minimum size of the blocks is 4×4 pixels according to Embodiment 1, the blocks may be larger or smaller. Furthermore, the blocks to be predicted may have a fixed size.

(7) Furthermore, the processing according to Embodiment 1 may be implemented by software. The software may be distributed through, for example, downloading. In addition, such software may be distributed by, for example, recording it on recording media such as CD-ROMs. This holds true for other Embodiments in the Description.

(Embodiment 2)

A moving picture coding apparatus and a moving picture coding method according to Embodiment 2 will be described with reference to FIGS. 10 to 15.

<2-1. Overall Configuration of Apparatus>

Figure 10:
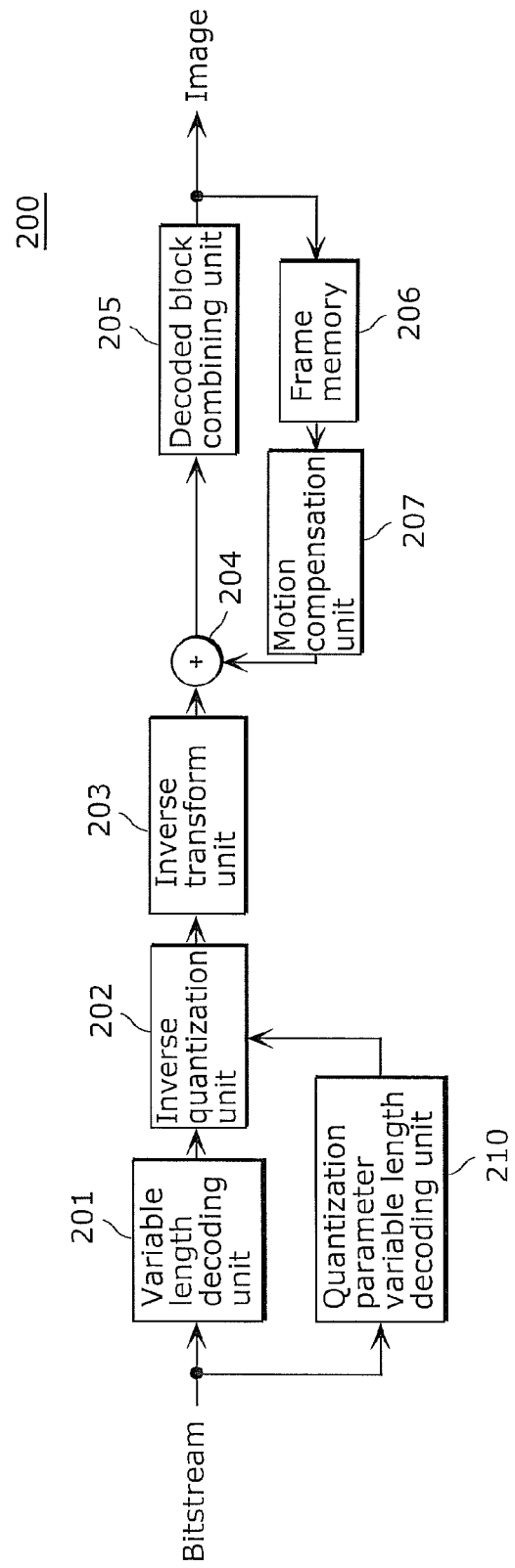
FIG. 10 is a block diagram illustrating an example configuration of a moving picture decoding apparatus according to Embodiment 2.

The moving picture decoding apparatus according to Embodiment 2 will be described with reference to FIG. 10. FIG. 10 is a block diagram illustrating an example configuration of a moving picture decoding apparatus 200 according to Embodiment 2.

The moving picture decoding apparatus 200 is an apparatus that decodes an input bitstream (coded bitstream) to generate a decoded image ("Image" in FIG. 10).

As illustrated in FIG. 10, the moving picture decoding apparatus 200 includes a variable length decoding unit 201, an inverse quantization unit 202, an inverse transform unit 203, an adding unit 204, a decoded block combining unit 205, a frame memory 206, a motion compensation unit 207, and a quantization parameter variable length decoding unit 210. Here, the variable length decoding unit 201, the inverse quantization unit 202, the inverse transform unit 203, the adding unit 204, the decoded block combining unit 205, the motion compensation unit 207, and the quantization parameter variable length decoding unit 210 are examples of circuits included in control circuitry.

The variable length decoding unit 201 performs entropy decoding (variable length decoding) on the bitstream input to the moving picture decoding apparatus 200 to obtain the quantized coefficients and various information necessary for decoding (partitioning information for the blocks to be predicted, a type of prediction, a motion vector, a prediction mode (intra prediction mode), a quantization parameter, etc.).

The quantization parameter variable length decoding unit 210 decodes, from the bitstream, cu_qp_delta that is a delta value between two quantization parameters. The delta value is a parameter corresponding to a quantization parameter. The quantization parameter variable length decoding unit 210 performs arithmetic coding and inverse binarization on the bitstream, as the variable length decoding.

As described above, the delta value of cu_qp_delta between two quantization parameters includes three syntaxes of significant_flag, minus1, and sign_flag.

Figure 11:
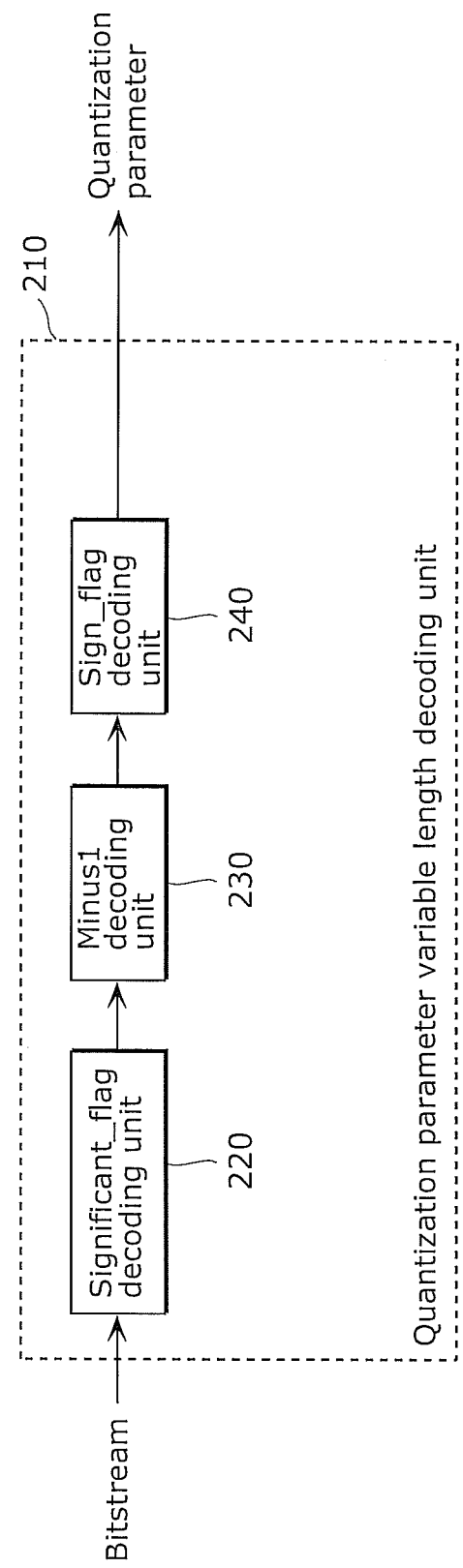
FIG. 11 is a block diagram illustrating an example configuration of a quantization parameter variable length decoding unit.

FIG. 11 is a block diagram illustrating an example configuration of the quantization parameter variable length decoding unit 210. As illustrated in FIG. 11, the quantization parameter variable length decoding unit 210 includes a significant_flag decoding unit 220, a minus1 decoding unit 230, and a sign_flag decoding unit 240.

The significant_flag decoding unit 220 performs the arithmetic decoding and the inverse binarization on coded significant_flag. The significant_flag decoding unit 220 performs context arithmetic decoding and inverse binarization using the truncated unary code according to Embodiment 2.

The minus1 decoding unit 230 performs the arithmetic coding and the inverse binarization on coded minus1. The minus1 decoding unit 230 performs the context arithmetic decoding and the inverse binarization using the exponential Golomb code on the first half of the coded minus1, and performs bypass arithmetic decoding and the inverse binarization using the exponential Golomb code on the latter half of the coded minus1 according to Embodiment 2.

Figure 12:
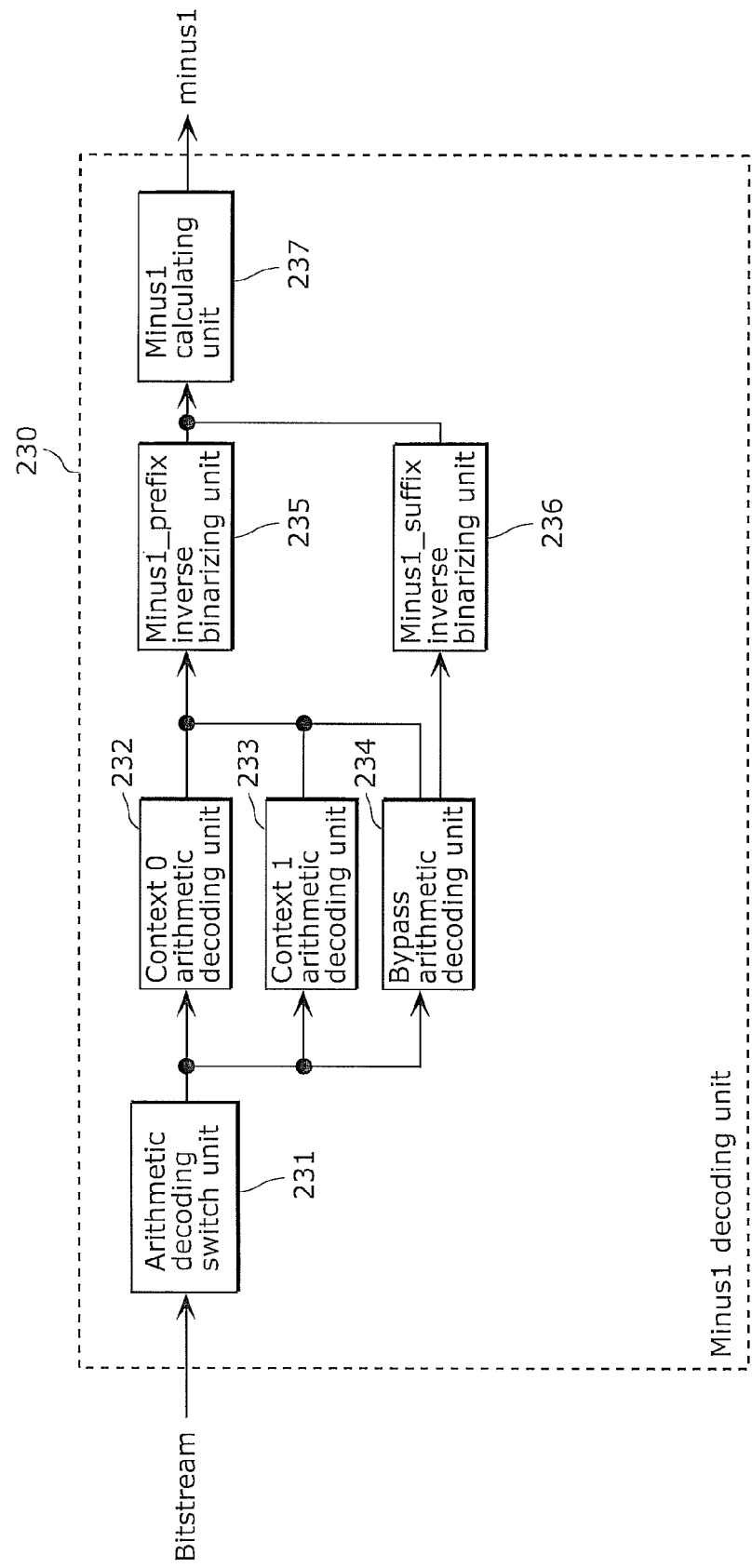
FIG. 12 is a block diagram illustrating an example configuration of a minus1 decoding unit.

FIG. 12 is a block diagram illustrating an example configuration of the minus1 decoding unit 230. As illustrated in FIG. 3, the minus1 decoding unit 230 includes an arithmetic decoding switch unit 231, a context 0 arithmetic decoding unit 232, a context 1 arithmetic decoding unit 233, a bypass arithmetic decoding unit 234, a minus1_prefix inverse binarizing unit 235, a minus1_suffix inverse binarizing unit 236, and a minus1 calculating unit 237.

The arithmetic decoding switch unit 231 switches a method of the arithmetic decoding to be applied to a bitstream. The context 0 arithmetic decoding unit 232 performs context 0 arithmetic decoding using a first context (context 0). The context 1 arithmetic decoding unit 233 performs context 1 arithmetic decoding using a second context (context 1).

The bypass arithmetic decoding unit 234 performs bypass arithmetic decoding using a fixed probability. The bypass arithmetic decoding unit 234 outputs, out of the bin string obtained after the bypass arithmetic decoding, minus1_prefix to the minus1_prefix inverse binarizing unit 235, and minus1_suffix to the minus1_suffix inverse binarizing unit 236.

The minus1_prefix inverse binarizing unit 235 converts the bin string (corresponding to minus1_prefix) output from each of the context 0 arithmetic decoding unit 232, the context 1 arithmetic decoding unit 233, and the bypass arithmetic decoding unit 234, into a non-binary signal. The minus1_suffix inverse binarizing unit 236 converts the bin string (corresponding to minus1_suffix) output from the bypass arithmetic decoding unit 234, into a non-binary signal.

The minus1 calculating unit 237 adds the minus1_prefix output from the minus1_prefix inverse binarizing unit 235 to the minus1_suffix output from the minus1_suffix inverse binarizing unit 236 to derive minus1.

As illustrated in FIG. 10, the inverse quantization unit 202 performs inverse quantization for transforming the quantized coefficients output from the variable length decoding unit 201 into the frequency coefficients, using the quantization parameter output from the quantization parameter variable length decoding unit 210.

The inverse transform unit 203 inversely transforms the frequency coefficients output from the inverse quantization unit 202 from the frequency domain to the image domain to derive a difference block.

The adding unit 204 adds a prediction block output from the motion compensation unit 207 to the difference block output from the inverse transform unit 203 to generate a decoded block.

The decoded block combining unit 205 combines the decoded blocks to reconstruct a decoded image. Furthermore, the decoded block combining unit 205 stores the decoded image in the frame memory 206.

The frame memory 206 includes a memory, such as a Random Access Memory (RAM) and a Read Only Memory (ROM).

The motion compensation unit 207 generates the prediction block through inter prediction or intra prediction. The prediction method to be applied by the motion compensation unit 207 is the same as that of the prediction unit 108.

<2-2 Overall Operations>

Figure 13:
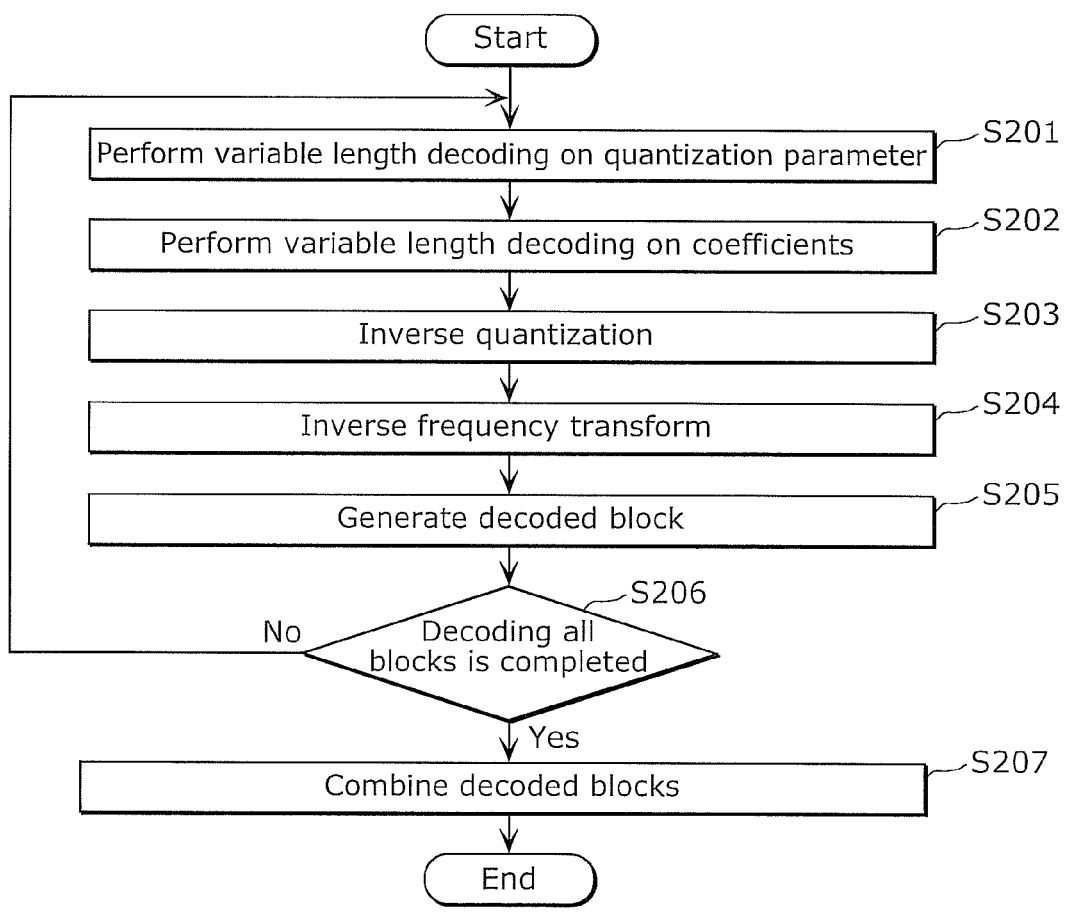
FIG. 13 is a flowchart indicating example processes performed by the moving picture decoding apparatus.

Next, the operations of the moving picture decoding apparatus 200 will be described with reference to FIG. 13. FIG. 13 is a flowchart indicating the procedure of the moving picture decoding apparatus 200.

The quantization parameter variable length decoding unit 210 performs variable length decoding on the coded quantization parameter included in the bitstream input to the moving picture decoding apparatus 200, and outputs the decoded quantization parameter to the inverse quantization unit 202 (S201).

Furthermore, the variable length decoding unit 201 performs variable length decoding on the coded quantized coefficients included in the bitstream input to the moving picture decoding apparatus 200, and outputs the decoded quantized coefficients to the inverse quantization unit 202 (S202).

The inverse quantization unit 202 performs inverse quantization for transforming the quantized coefficients output from the variable length decoding unit 201 into the frequency coefficients, using the quantization parameter output from the quantization parameter variable length decoding unit 210 (S203).

The inverse transform unit 203 inversely transforms the frequency coefficients output from the inverse quantization unit 202 from the frequency domain to the image domain (S204). With the inverse transform, a difference block is generated.

The motion compensation unit 207 generates a prediction block from the decoded image stored in the frame memory 206.

The adding unit 204 adds the prediction block output from the motion compensation unit 207 to the difference block output from the inverse transform unit 203 to generate a decoded block (S205).

The moving picture decoding apparatus 200 repeats the processes from Step 201 to Step 205, until the completion of decoding all the blocks included in the picture to be decoded (S206).

The decoded block combining unit 205 combines all the decoded blocks included in the picture to be decoded to generate a decoded image (S207). Furthermore, the decoded block combining unit 205 stores the decoded image generated, in the frame memory 206.

<2-2-1. Operations of the Quantization Parameter Variable Length Decoding Unit>

Figure 14:
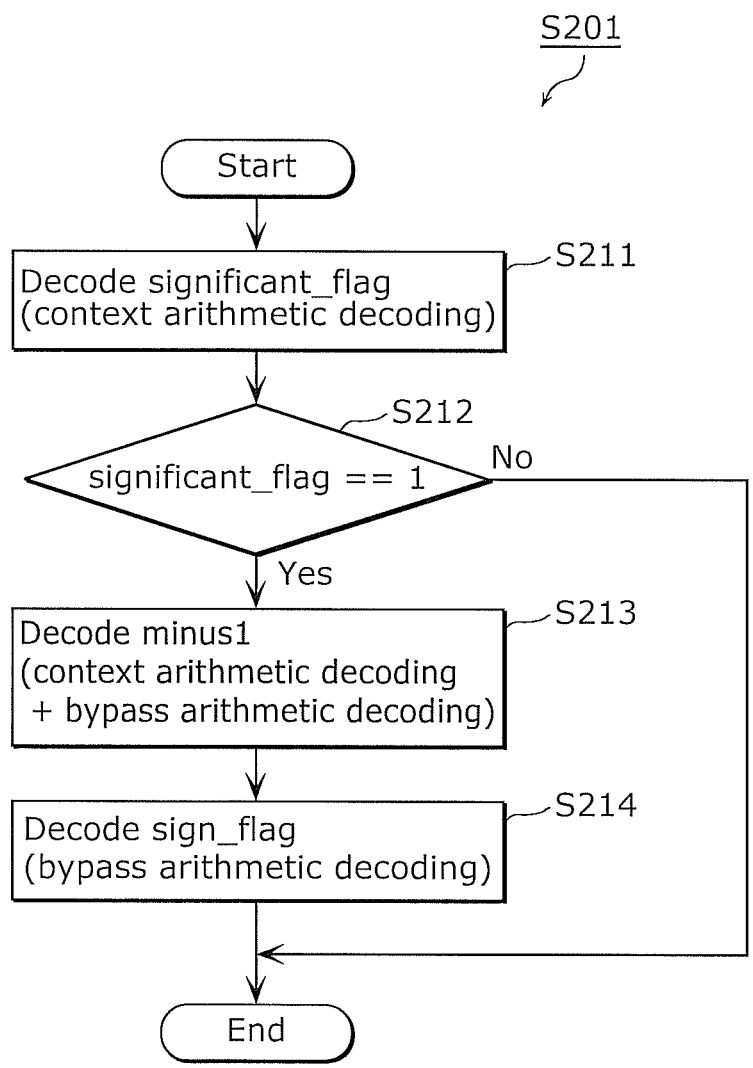
FIG. 14 is a flowchart indicating example processes performed by the quantization parameter variable length decoding unit.

The operations of the quantization parameter variable length decoding unit 210 according to Embodiment 2 will be described with reference to FIG. 14. FIG. 14 is a flowchart indicating an example process (S201) performed by the quantization parameter variable length decoding unit 210.

The significant_flag decoding unit 220 of the quantization parameter variable length decoding unit 210 decodes significant_flag (S211). Furthermore, the decoding herein includes the arithmetic decoding and the inverse binarization. In the arithmetic decoding, context arithmetic decoding is performed using the context 0.

When significant_flag indicates 1 (Yes at S212), the quantization parameter variable length decoding unit 210 proceeds to Step S213. When significant_flag indicates 0 (No at S212), the quantization parameter variable length decoding unit 210 ends the decoding of the current quantization parameter because of no minus1 and no sign_flag.

The minus1 decoding unit 230 decodes minus' (S213). The minus1 decoding unit 230 performs the context arithmetic decoding on the first half of minus1, and performs bypass arithmetic decoding on the latter half of minus1. The details will be described later.

The sign_flag decoding unit 240 decodes sign_flag (S214). The sign_flag decoding unit 240 performs context arithmetic decoding herein.

<2-2-2. Operations of the Minus1 Decoding Unit 230>

Figure 15:
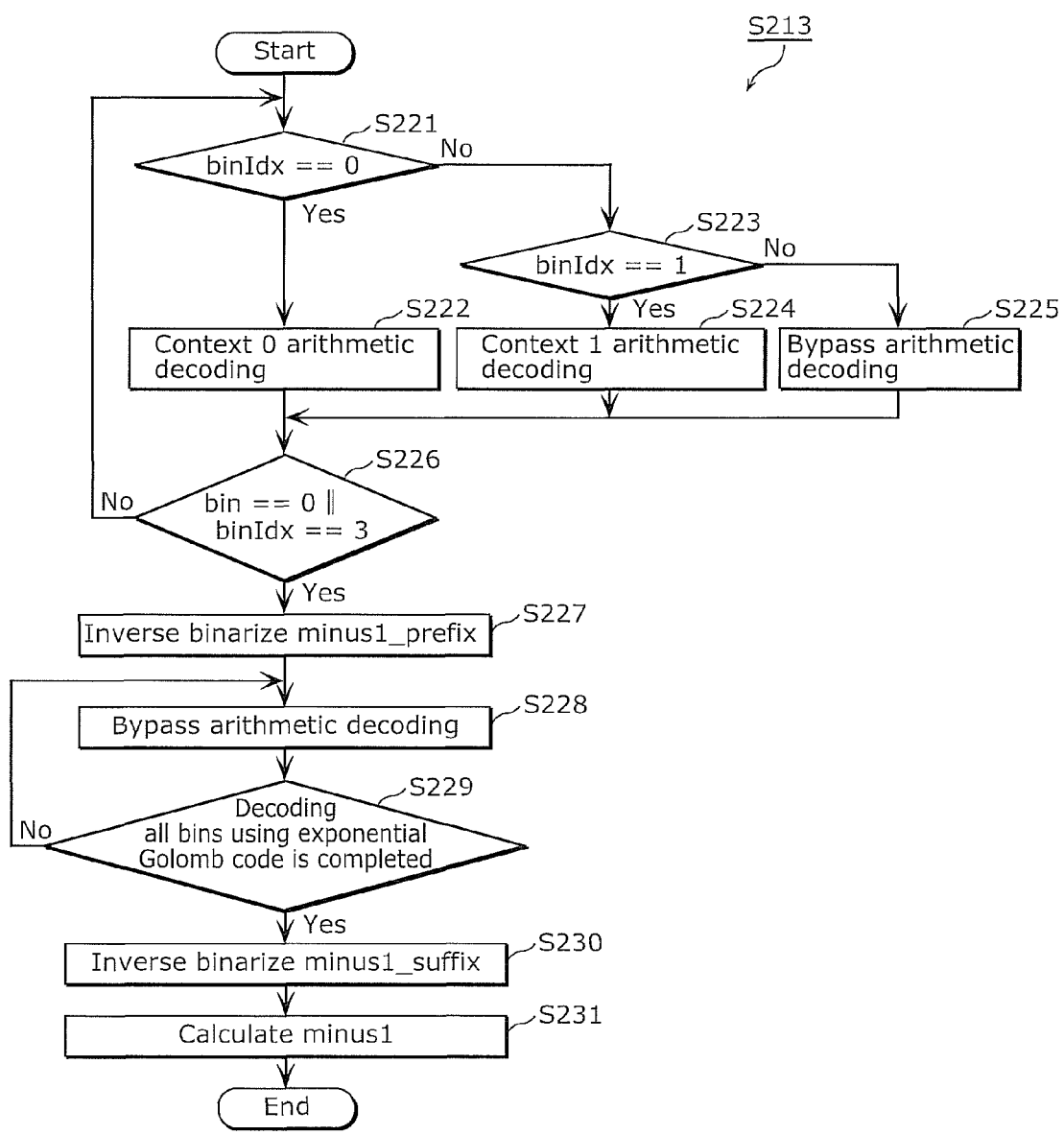
FIG. 15 is a flowchart indicating example processes performed by the minus1 decoding unit.

The operations of the minus1 decoding unit 230 according to Embodiment 2 will be described with reference to FIG. 15. FIG. 15 is a flowchart indicating an example process (S213) performed by the minus1 decoding unit 230.

The arithmetic decoding switch unit 231 transmits each bin included in the non-binary signal to one of the three arithmetic decoding units, according to the value of the binIdx of a bin to be decoded (S221 and S223).

When the value is 0 (Yes at S221), the arithmetic decoding switch unit 231 outputs the bin to the context 0 arithmetic decoding unit 232. The context 0 arithmetic decoding unit 232 performs context arithmetic decoding on the bin whose binIdx is 0, using the context 0 (S222). The context 0 arithmetic decoding unit 232 outputs the bin on which the context arithmetic decoding has been performed, to the minus1_prefix inverse binarizing unit 235.

When the value is 1 (No at S221 and Yes at S223), the arithmetic decoding switch unit 231 outputs the bin to the context 1 arithmetic decoding unit 233. The context 1 arithmetic decoding unit 233 performs context 1 arithmetic decoding on the bin whose binIdx is 1, using the context 1 (S224). The context 1 arithmetic decoding unit 233 outputs the bin on which the context arithmetic decoding has been performed, to the minus1_prefix inverse binarizing unit 235.

When the value is neither 0 nor 1 (No at S221 and No at S223), the arithmetic decoding switch unit 231 outputs the bin to the bypass arithmetic decoding unit 234.

The bypass arithmetic decoding unit 234 performs bypass arithmetic decoding on minus1_prefix in the coded minus1 (S225). Furthermore, the bypass arithmetic decoding unit 234 outputs the minus1_prefix on which the bypass arithmetic decoding has been performed.

The processes from Step 221 to Step 225 are repeated until decoding (i) a bin whose value indicating a result of the arithmetic decoding is 0 or (ii) a bin whose binIdx is 3 is completed (S226).

The minus1_prefix inverse binarizing unit 235 obtains minus1_prefix of a bin string using a signal output from each of the context 0 arithmetic decoding unit 232, the context 1 arithmetic decoding unit 233, and the bypass arithmetic decoding unit 234. Here, minus1_prefix is a bin string that is binarized using the exponential Golomb arithmetic coding. The minus1_prefix inverse binarizing unit 235 converts minus1_prefix from a bin string to a non-binary signal (S227). The correspondence between the non-binary signals and the bin strings using the exponential Golomb code is the same as shown in FIG. 7 according to Embodiment 1.

The bypass arithmetic decoding unit 234 performs bypass arithmetic decoding on the remaining bins, that is, minus1_suffix (S228 and S229). Here, the decoded binminus1_suffix is a bin string that is binarized using the exponential Golomb arithmetic coding.

The minus1_suffix inverse binarizing unit 236 converts the minus1_suffix output from the bypass arithmetic decoding unit 234 from a bin string to a non-binary signal (S230). The correspondence between the non-binary signals and the bin strings using the exponential Golomb code is the same as shown in FIG. 8 according to Embodiment 1.

The minus1 calculating unit 237 adds the minus1_prefix output from the minus1_prefix inverse binarizing unit 235 to the minus1_suffix output from the minus1_suffix inverse binarizing unit 236 to calculate the minus1 (S231).

<2-3. Advantages>

As described above, the moving picture decoding apparatus 200 according to Embodiment 2 can produce the same advantages as those according to Embodiment 1.

For example, since the moving picture decoding apparatus 200 according to Embodiment 2 uses a signal in which the latter half of a parameter indicating an absolute value in a parameter of a delta value between two quantization parameters is binarized using the exponential Golomb code, it does not require information on the maximum value and can perform inverse binarization. In other words, there is no need (dependency) to inversely binarize sign_flag indicating a sign before inversely binarizing the latter half of the parameter indicating the absolute value, thus achieving acceleration of the processing.

Furthermore, the moving picture decoding apparatus 200 according to Embodiment 2 performs bypass arithmetic decoding on the latter half of the bins of minus1. Accordingly, the processing can be accelerated.

In each of Embodiments, each of the functional blocks may be typically implemented by, for example, an MPU and a memory. Furthermore, the processing by each of the functional blocks may typically be implemented by software (a program), and such software is recorded on a recording medium such as a ROM. In addition, such software may be distributed by, for example, downloading, and recording it on recording media such as CD-ROMs. Each of the functional blocks can be implemented by hardware (a dedicated circuit).

The processing described in each of Embodiments may be performed as centralized processing by a single apparatus (system) or may be performed as decentralized processing by a plurality of apparatuses. Here, the program may be executed by one or more computers. In other words, any one of the centralized processing and the decentralized processing may be performed.

The present disclosure is not limited to Embodiments, and various kinds of modifications are possible in the present disclosure. All such modifications are naturally included within the scope of the present disclosure.

(Embodiment 3)

An independent computer system can easily perform processing described in each of Embodiments by recording, in a recording medium, a program for implementing the structure of the moving picture coding method (image coding method) or the moving picture decoding method (image decoding method) according to Embodiment. The recording medium may be any as long as the program can be recorded thereon, such as a magnetic disk, an optical disk, an optical magnetic disk, an IC card, and a semiconductor memory.

Hereinafter, applications of the moving picture coding method (image coding method) and the moving picture decoding method (image decoding method) according to each of Embodiments, and a system using such applications will be described. The system features including an image coding apparatus using the image coding method, and an image coding and decoding apparatus including an image decoding apparatus using the image decoding method. The other configurations of the system can be appropriately changed depending on a case.

Figure 16:
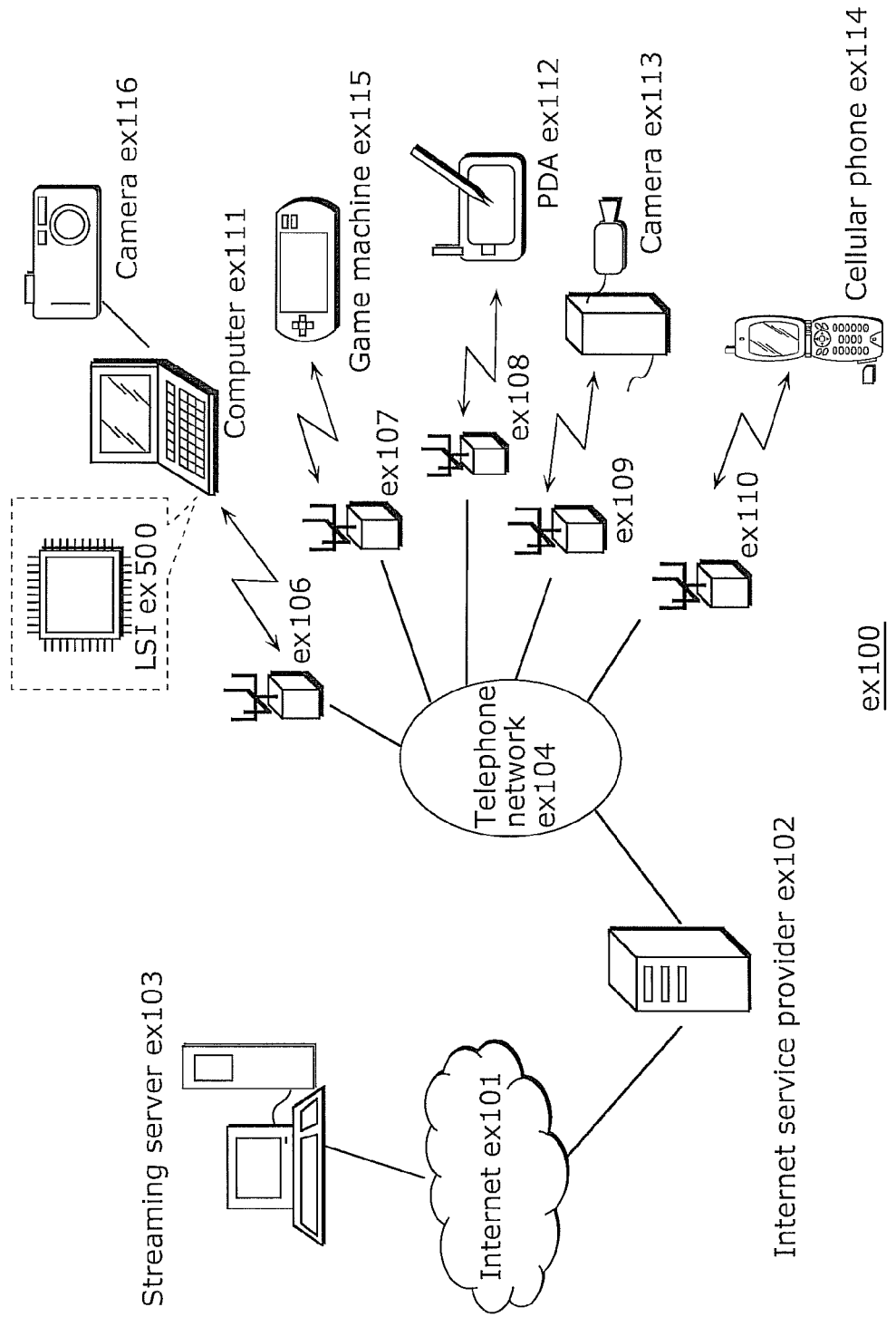
FIG. 16 illustrates an overall configuration of a content providing system for implementing content distribution services.

FIG. 16 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114, and a game machine ex115, via an Internet ex101, an Internet service provider ex102, a telephone network ex104, as well as the base stations ex106 to ex110.

However, the configuration of the content providing system ex100 is not limited to the configuration shown in FIG. 16, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and the moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, generally, the computer ex111 and an LSI ex500 included in each of the devices perform such encoding and decoding processes. The LSI ex500 may be configured of a single chip or a plurality of chips. Software for encoding and decoding moving pictures may be integrated into some type of a recording medium (such as a CD-ROM, a flexible disk, a hard disk) that is readable by the computer ex111 and others, and the encoding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 17:
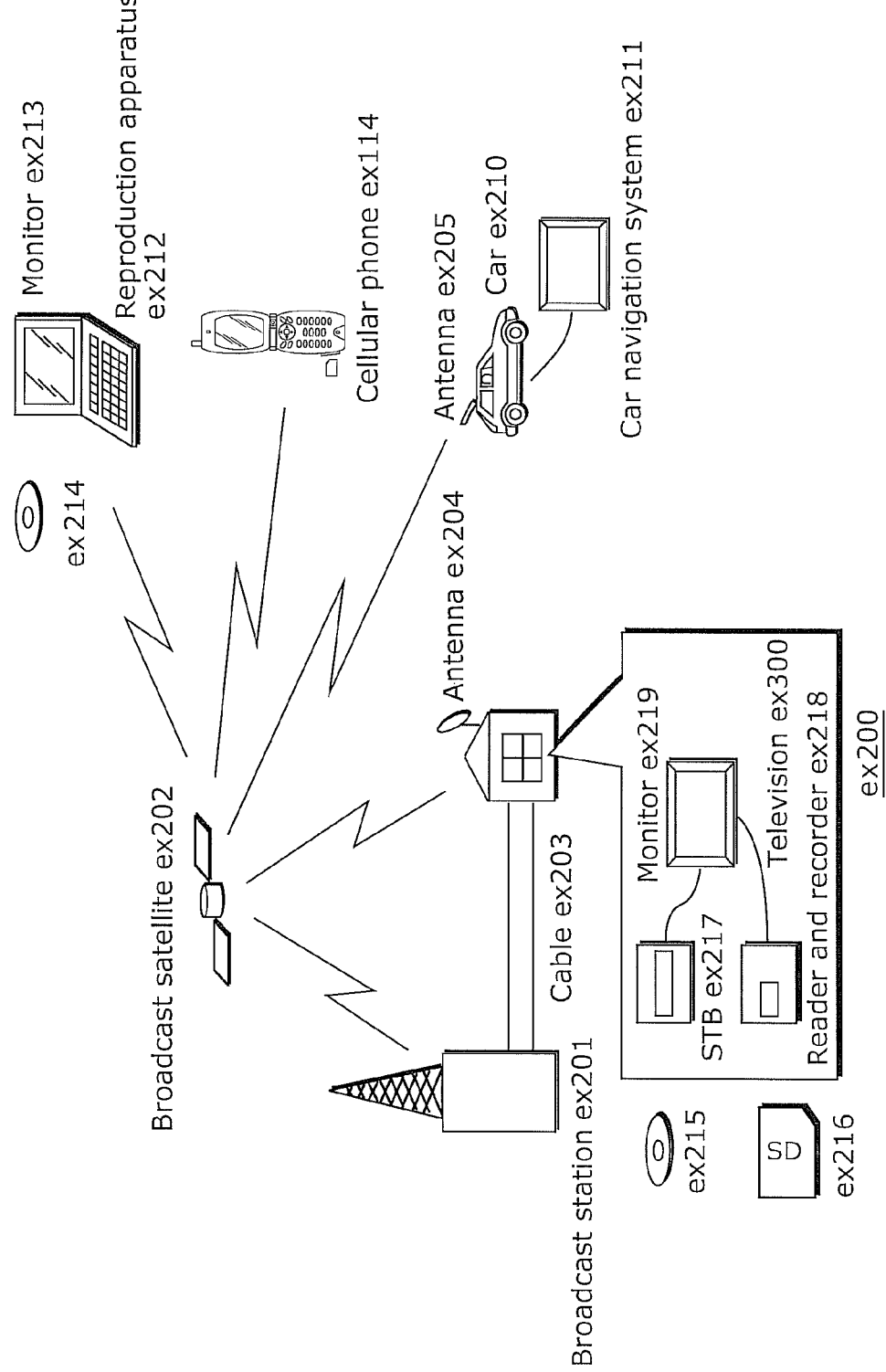
FIG. 17 illustrates an overall configuration of a digital broadcasting system.

The present disclosure is not limited to the above-mentioned content providing system ex100, and at least either the moving picture coding apparatus (image coding apparatus) or the moving picture decoding apparatus (image decoding apparatus) described in each of Embodiments can be incorporated into a digital broadcasting system ex200 as shown in FIG. 17. More specifically, a broadcast station ex201 communicates or transmits, via radio waves to a broadcast satellite ex202, multiplexed data obtained by multiplexing the audio data onto the video data. The video data is data coded according to the moving picture coding method described in each of Embodiments (that is, data coded by the image coding apparatus according to the aspect of the present disclosure). Upon receipt of the video data, the broadcast satellite ex202 transmits radio waves for broadcasting. Then, a home-use antenna ex204 capable of receiving a satellite broadcast receives the radio waves. A device, such as a television (receiver) ex300 and a set top box (STB) ex217, decodes the received multiplexed data and reproduces the data (that is, functions as the image decoding apparatus according to the aspect of the present disclosure).

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the moving picture decoding apparatus or the moving picture coding apparatus as shown in each of Embodiments. In this case, the reproduced video signals are displayed on the monitor ex219, and another apparatus or system can reproduce the video signals, using the recording medium ex215 on which the multiplexed data is recorded. Furthermore, it is also possible to implement the moving picture decoding apparatus in the set top box ex217 connected to the cable ex203 for a cable television or the antenna ex204 for satellite and/or terrestrial broadcasting, so as to display the video signals on the monitor ex219 of the television ex300. The moving picture decoding apparatus may be included not in the set top box but in the television ex300.

Figure 18:
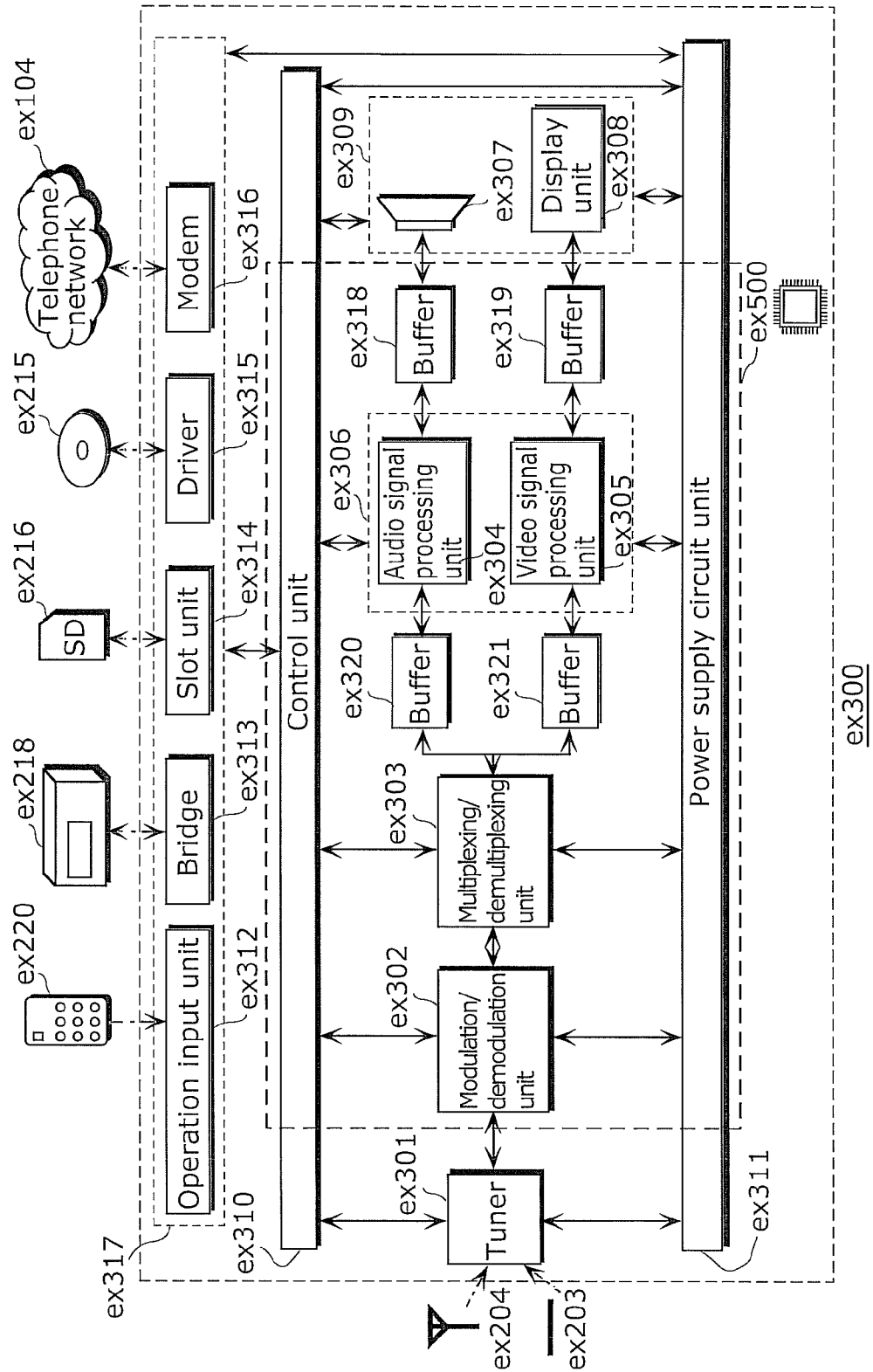
FIG. 18 illustrates a block diagram of an example of a configuration of a television.

FIG. 18 illustrates the television (receiver) ex300 that uses the moving picture coding method and the moving picture decoding method described in each of Embodiments. The television ex300 includes: a tuner ex301 that obtains or provides multiplexed data obtained by multiplexing the audio data and the video data through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes the video data and audio data coded by the signal processing unit ex306 into data.

Furthermore, the television ex300 further includes: a signal processing unit ex306 including an audio signal processing unit ex304 and a video signal processing unit ex305 that decode audio data and video data and code audio data and video data, respectively (which function as the image coding apparatus or the image decoding apparatus according to the aspect of the present disclosure); a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes the multiplexed data obtained from outside through the antenna ex204 and others and reproduces the decoded data will be described. In the television ex300, upon receipt of a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read the multiplexed data not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes the multiplexed data from or in a recording medium, one of the television ex300 and the reader/recorder ex218 may decode or code the multiplexed data, and the television ex300 and the reader/recorder ex218 may share the decoding or encoding.

Figure 19:
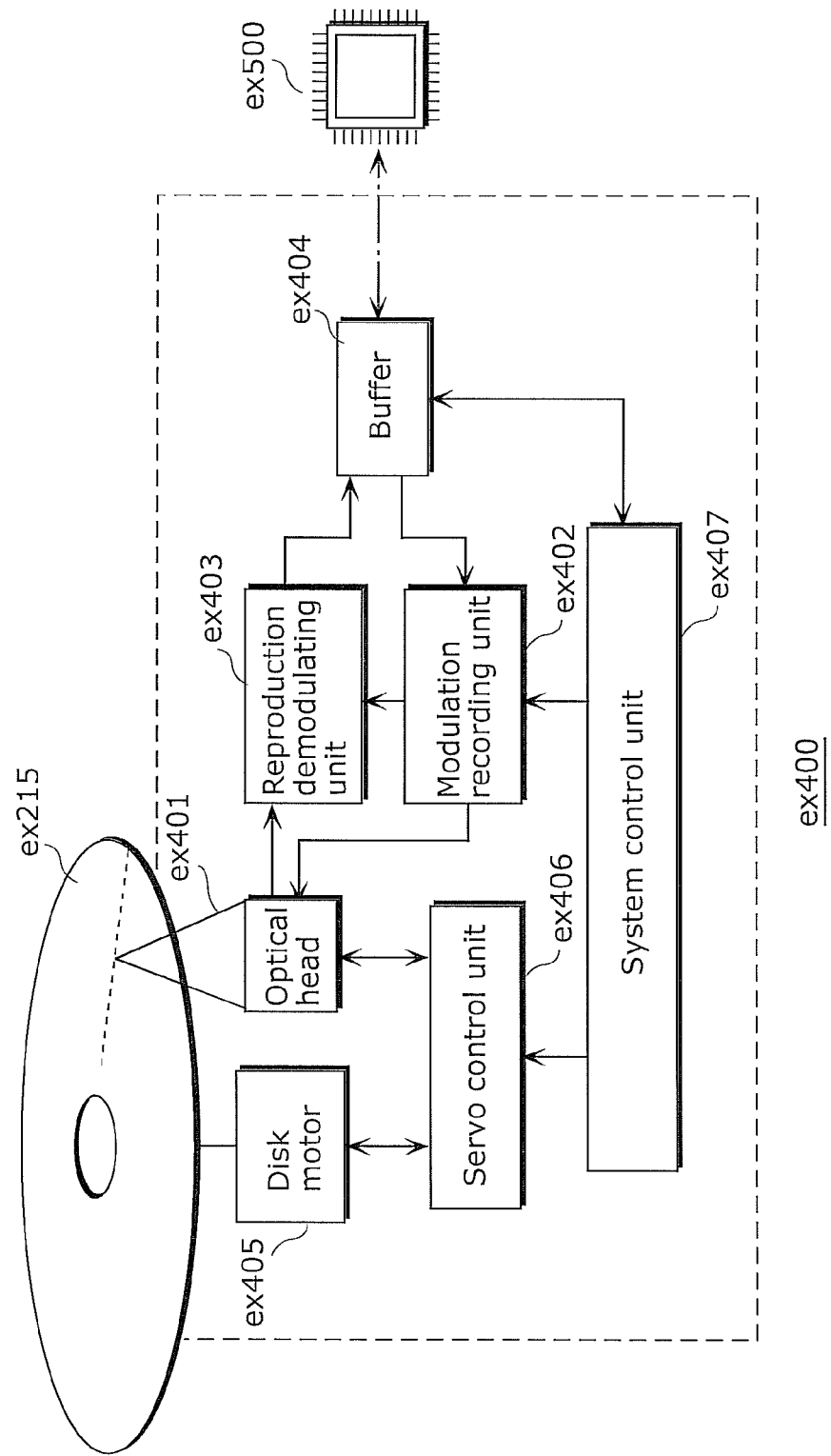
FIG. 19 illustrates a block diagram illustrating an example of a configuration of an information reproducing/recording unit that reads and writes information from or on a recording medium that is an optical disc.

As an example, FIG. 19 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 20:
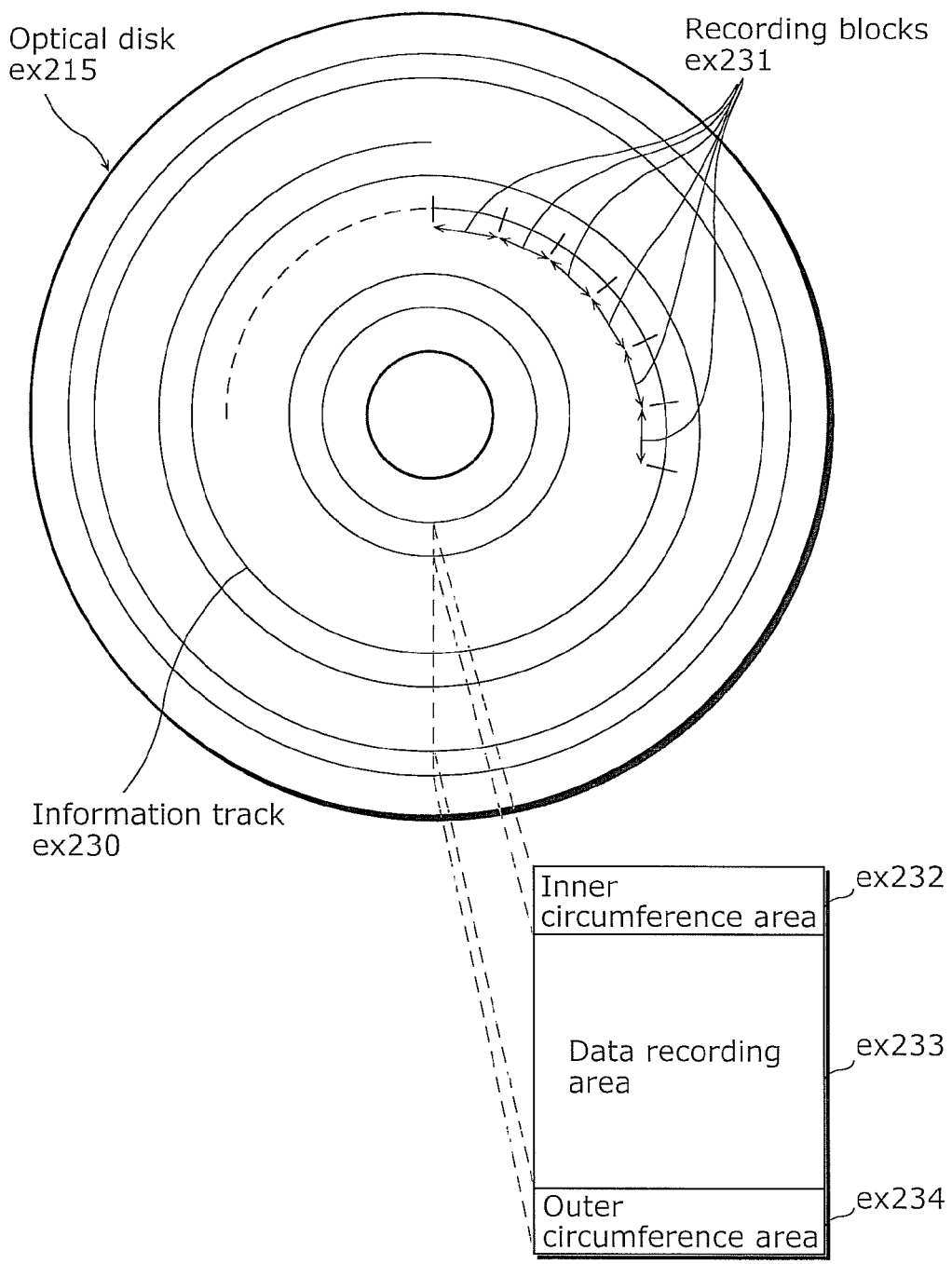
FIG. 20 illustrates an example of a configuration of a recording medium that is an optical disc.

FIG. 20 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or multiplexed data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be the one for example, including a GPS receiving unit in the configuration illustrated in FIG. 18. The same will be true for the configuration of the computer ex111, the cellular phone ex114, and others.

Figure 21A:
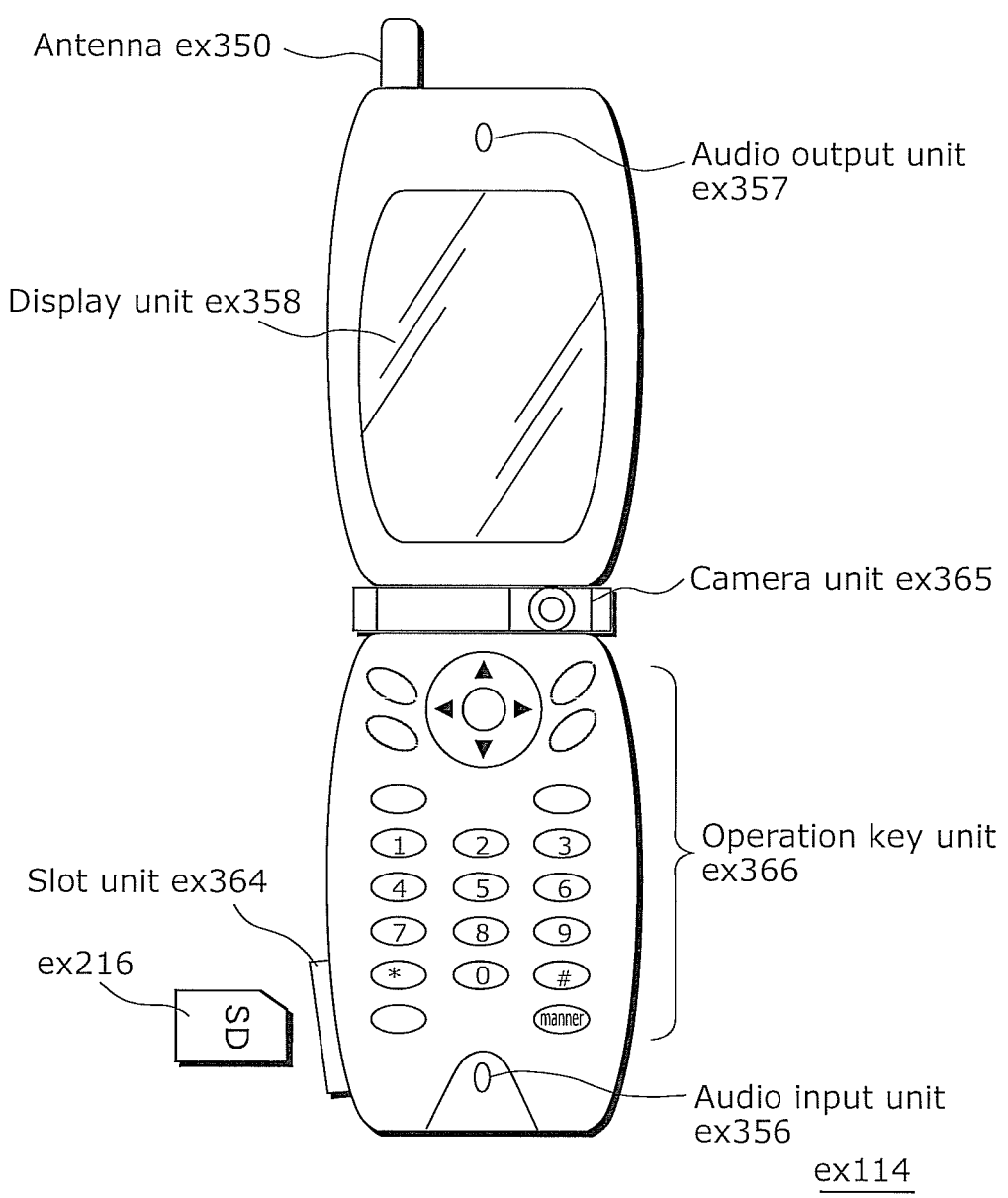
FIG. 21A illustrates an example of a cellular phone.

FIG. 21A illustrates the cellular phone ex114 that uses the moving picture coding method and the moving picture decoding method described in each of Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still images, e-mails, or others; and a slot unit ex364 that is an interface unit for a recording medium that stores data in the same manner as the memory unit ex367.

Next, an example of a configuration of the cellular phone ex114 will be described with reference to FIG. 21B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 (that is, functioning as the image coding apparatus according to the aspect of the present disclosure) compresses and codes video signals supplied from the camera unit ex365 using the moving picture coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 (that is, functioning as the image decoding apparatus according to the aspect of the present disclosure) decodes the video signal using a moving picture decoding method corresponding to the moving picture coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method or the moving picture decoding method in each of Embodiments can be used in any of the devices and systems described. Thus, the advantages described in each of Embodiments can be obtained.

Furthermore, the present disclosure is not limited to Embodiments, and various modifications and revisions are possible without departing from the scope of the present disclosure.

(Embodiment 4)

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method or by the moving picture coding apparatus shown in each of Embodiments will be hereinafter described. The multiplexed data is a digital stream in the MPEG-2 Transport Stream format.

FIG. 22 illustrates a structure of multiplexed data. As illustrated in FIG. 22, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the moving picture coding method or by the moving picture coding apparatus shown in each of Embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 23:
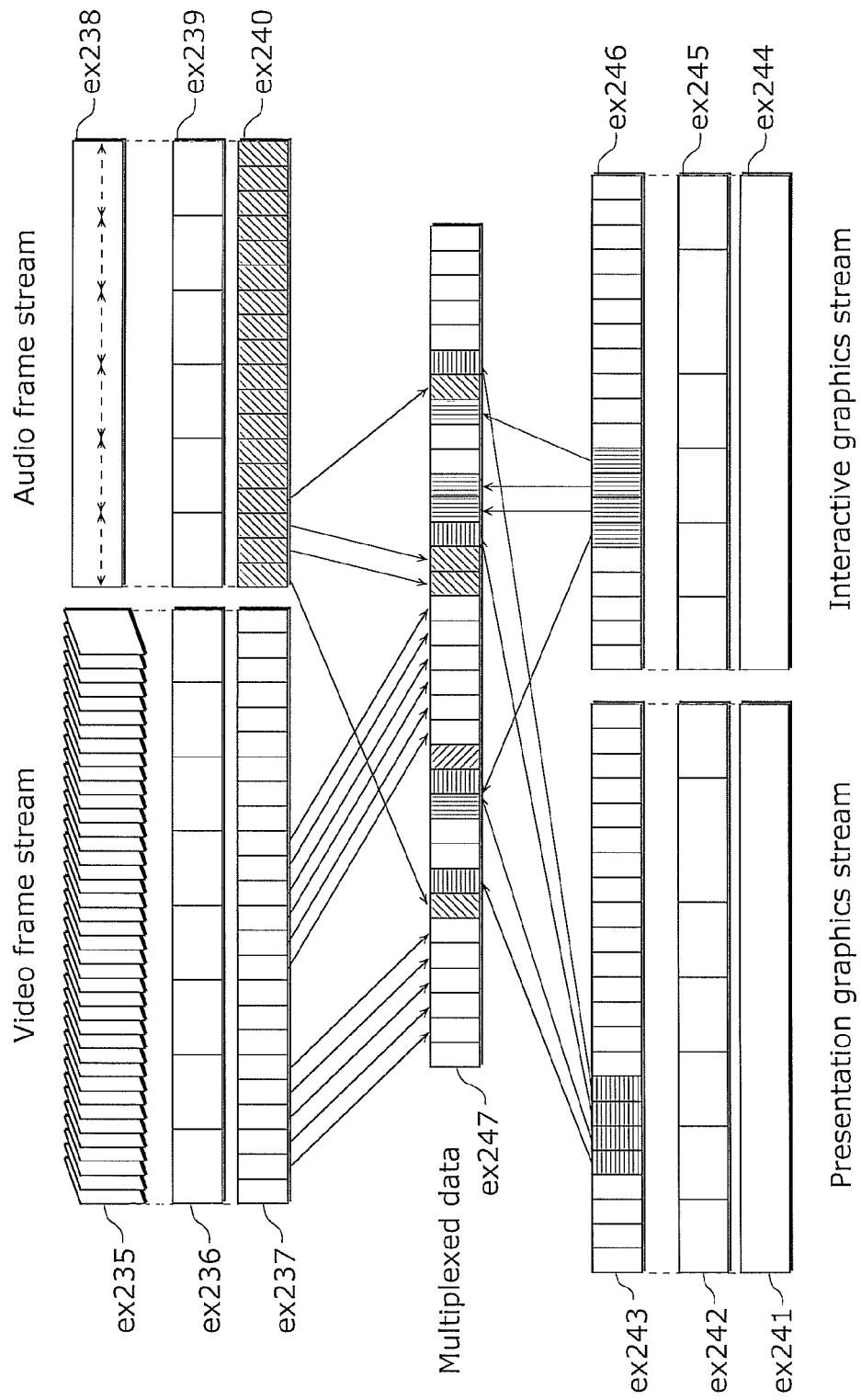
FIG. 23 schematically illustrates how each stream is multiplexed in multiplexed data.

FIG. 23 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 24:
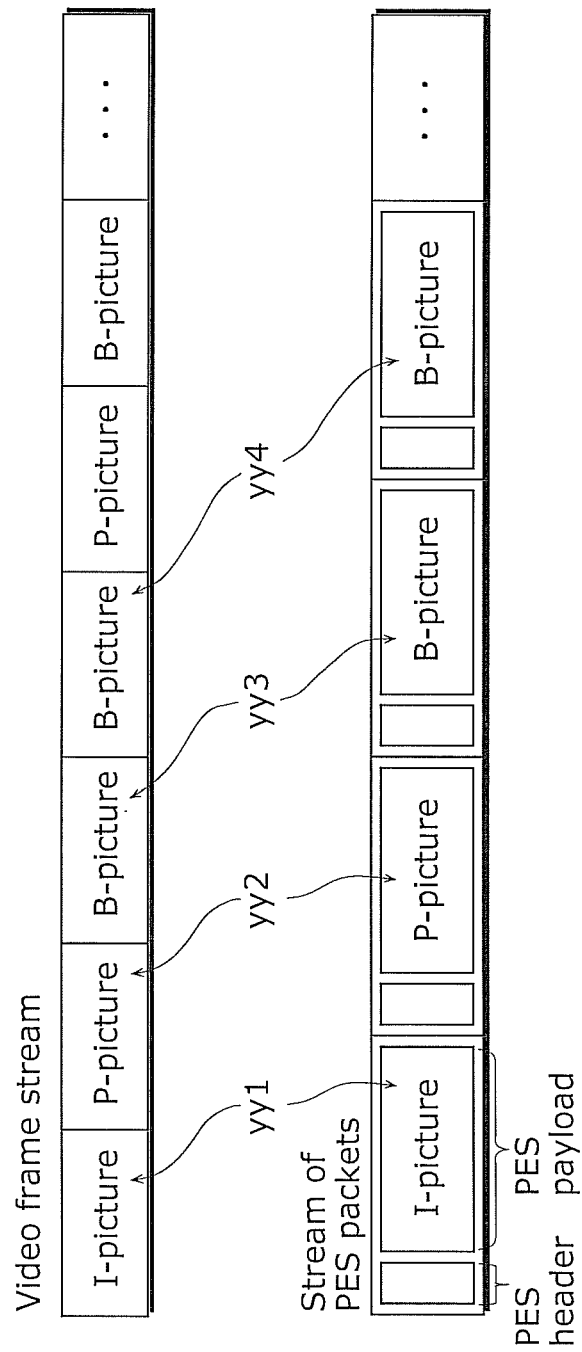
FIG. 24 illustrates how a video stream is stored in a stream of PES packets in more detail.

FIG. 24 illustrates how a video stream is stored in a stream of PES packets in more detail. The first bar in FIG. 24 shows a video frame stream in a video stream. The second bar shows the stream of PES packets. As indicated by arrows yy1, yy2, yy3, and yy4 in FIG. 24, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 25 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The numbers incrementing from the head of the multiplexed data are called source packet numbers (SPNs) as shown at the bottom of FIG. 25.

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 26:
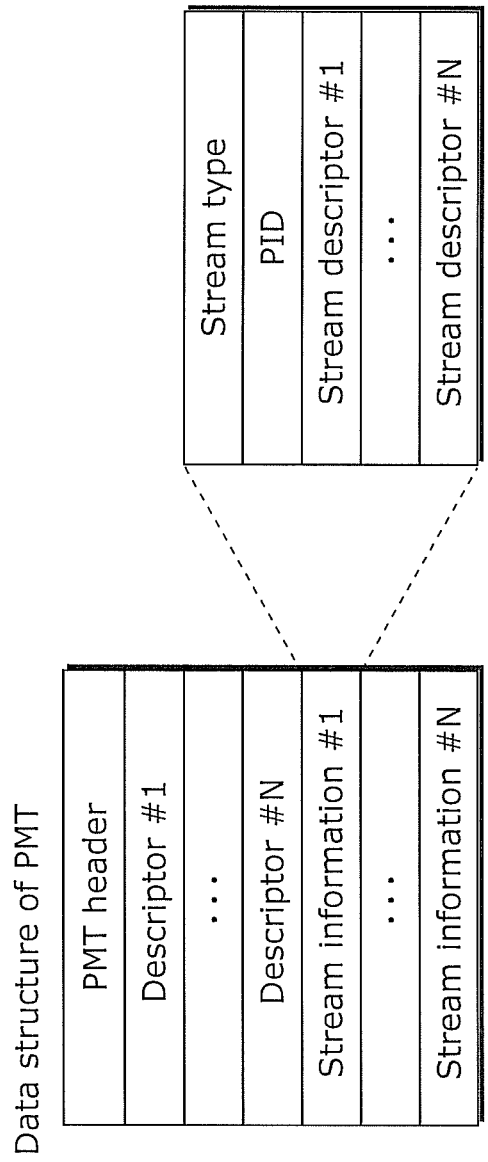
FIG. 26 illustrates a data structure of a PMT.

FIG. 26 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 27:
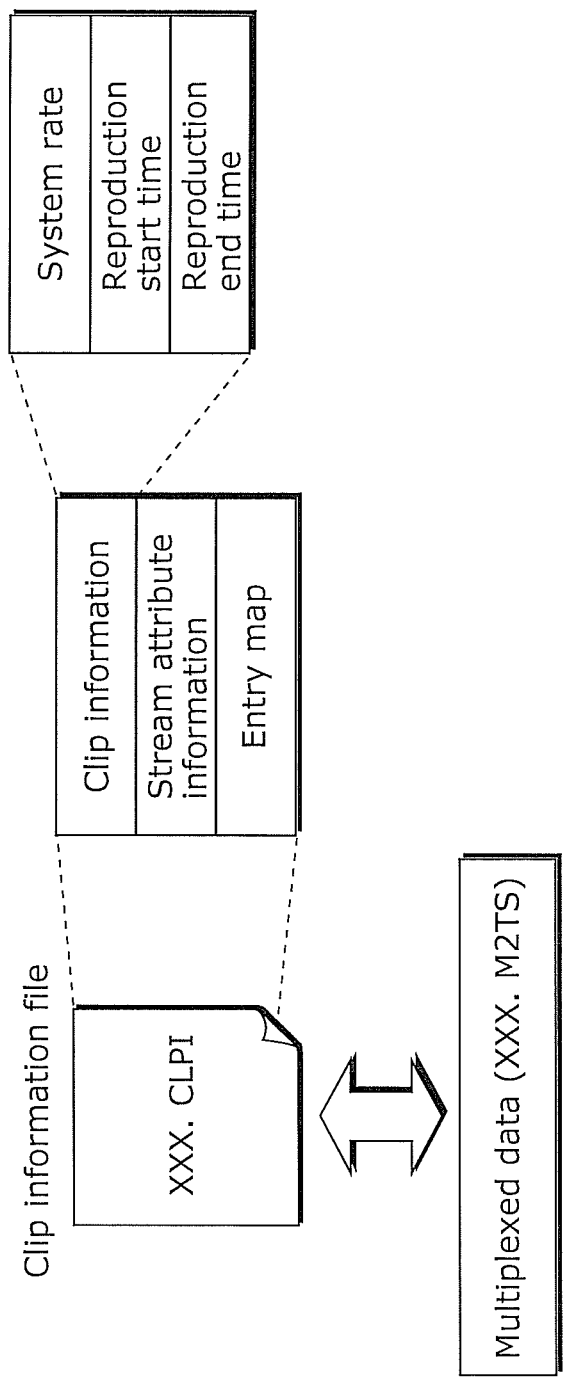
FIG. 27 illustrates an internal structure of multiplexed data information.

Each of the multiplexed data information files is management information of the multiplexed data as shown in FIG. 27. The multiplexed data information files are in one to one correspondence with the multiplexed data, and each of the files includes multiplexed data information, stream attribute information, and an entry map.

As illustrated in FIG. 27, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 28:
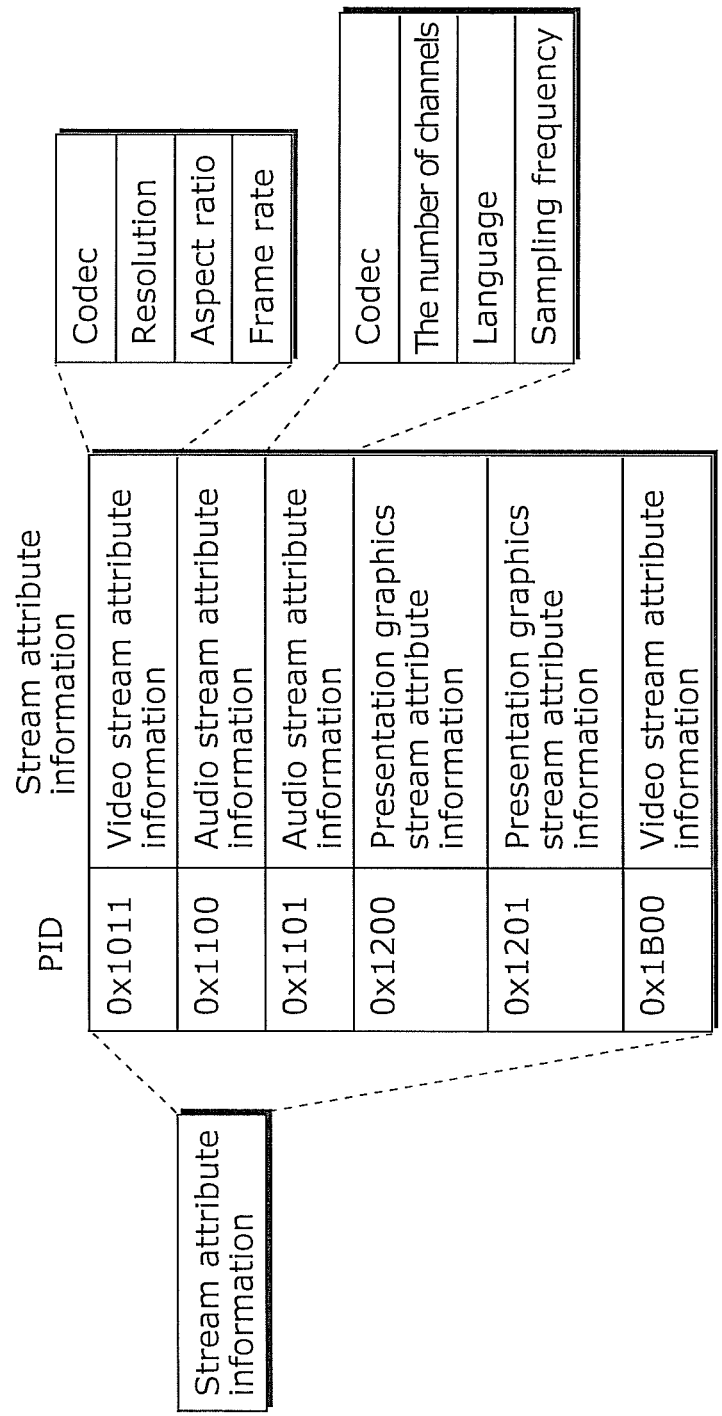
FIG. 28 illustrates an internal structure of stream attribute information.

As shown in FIG. 28, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 4, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of Embodiments includes a step or a unit for allocating unique information indicating video data generated by the moving picture coding method or the moving picture coding apparatus in each of Embodiments, to the stream type included in the PMT or the video stream attribute information. With the structure, the video data generated by the moving picture coding method or the moving picture coding apparatus described in each of Embodiments can be distinguished from video data that conforms to another standard.

Figure 29:
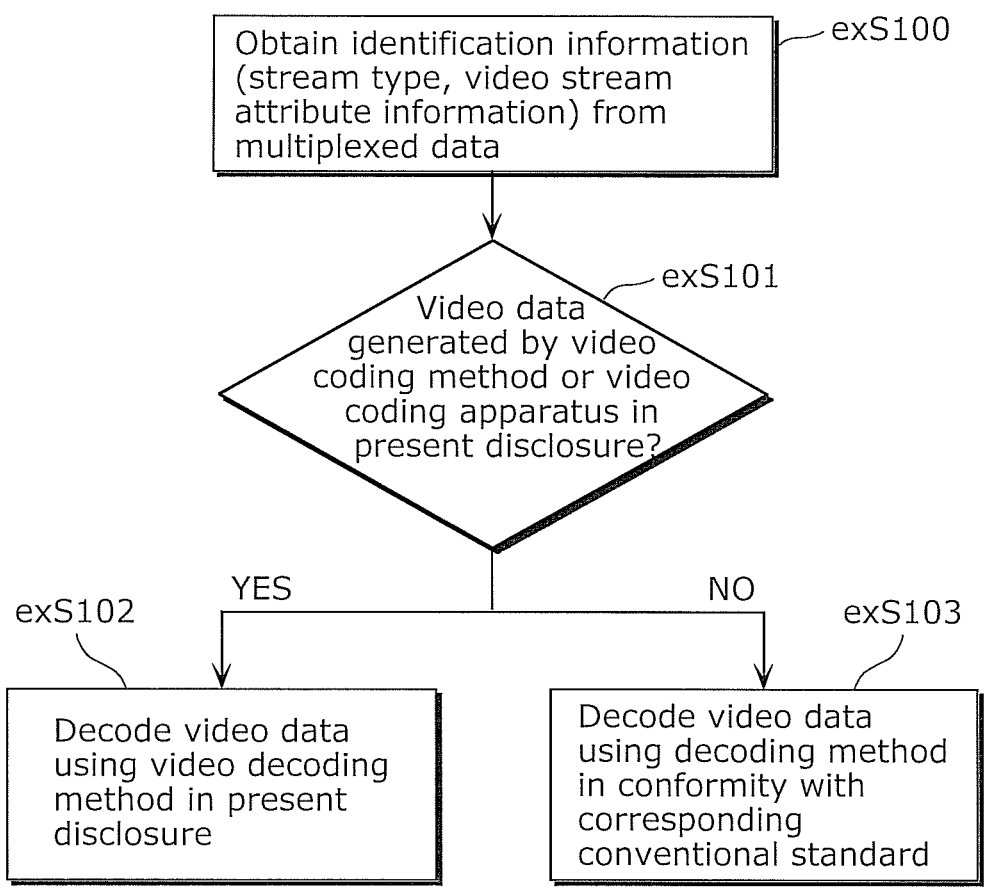
FIG. 29 illustrates steps for identifying video data.

Furthermore, FIG. 29 illustrates steps of the moving picture decoding method according to Embodiment 4. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of Embodiments. When it is determined that the stream type or the video stream attribute information indicates that the multiplexed data is generated by the moving picture coding method or the moving picture coding apparatus in each of Embodiments, in Step exS102, the stream type or the video stream attribute information is decoded by the moving picture decoding method in each of Embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a moving picture decoding method in conformity with the conventional standards.

As such, allocating a new unique value to the stream type or the video stream attribute information enables determination whether or not the moving picture decoding method or the moving picture decoding apparatus that is described in each of Embodiments can perform decoding. Even upon an input of multiplexed data that conforms to a different standard, an appropriate decoding method or apparatus can be selected. Thus, it becomes possible to decode information without any error. Furthermore, the moving picture coding method or apparatus, or the moving picture decoding method or apparatus in Embodiment 4 can be used in the devices and systems described above.

(Embodiment 5)

Each of the moving picture coding method, the moving picture coding apparatus, the moving picture decoding method, and the moving picture decoding apparatus in each of Embodiments is typically achieved in the form of an integrated circuit or a Large Scale Integrated (LSI) circuit.

Figure 30:
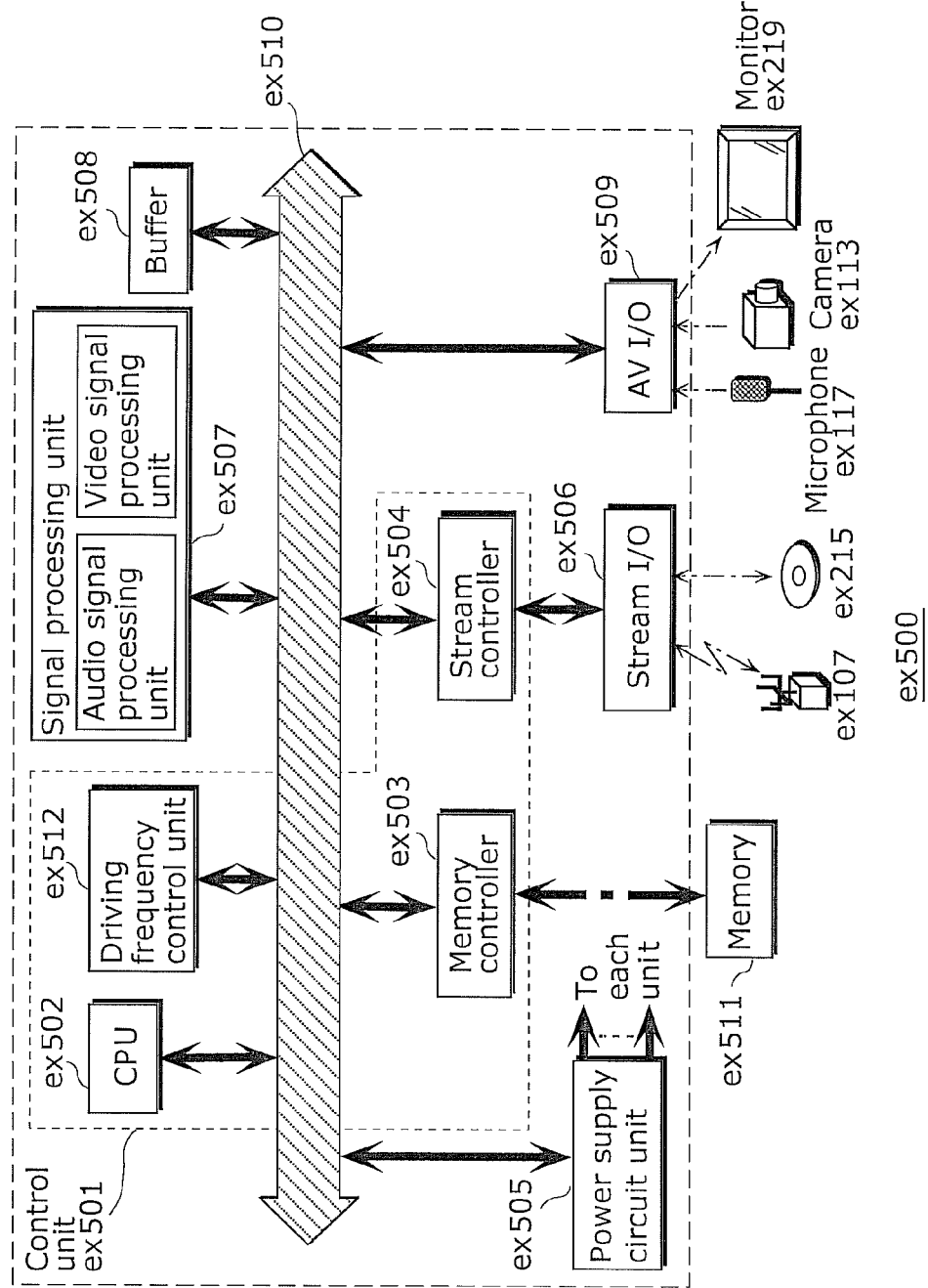
FIG. 30 illustrates a block diagram illustrating an example of a configuration of an integrated circuit for implementing a moving picture coding method and a moving picture decoding method according to each of Embodiments.

As an example of the LSI, FIG. 30 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may include the signal processing unit ex507, or an audio signal processing unit that is a part of the signal processing unit ex507. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. The programmable logic device can typically execute the moving picture coding method and the moving picture decoding method according to Embodiments and Variations, by loading or reading, from a memory, the program included in software or firmware.

In the future, with advancement in semiconductor technology, a brand-new technology may replace LSI. The functional blocks can be integrated using such a technology. The possibility is that the present disclosure is applied to biotechnology.

(Embodiment 6)

When video data generated by the moving picture coding method or by the moving picture coding apparatus described in each of Embodiments is decoded, compared to the case of decoding video data that conforms to a conventional standard, such as MPEG-2, MPEG4-AVC, and VC-1, the computing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 31:
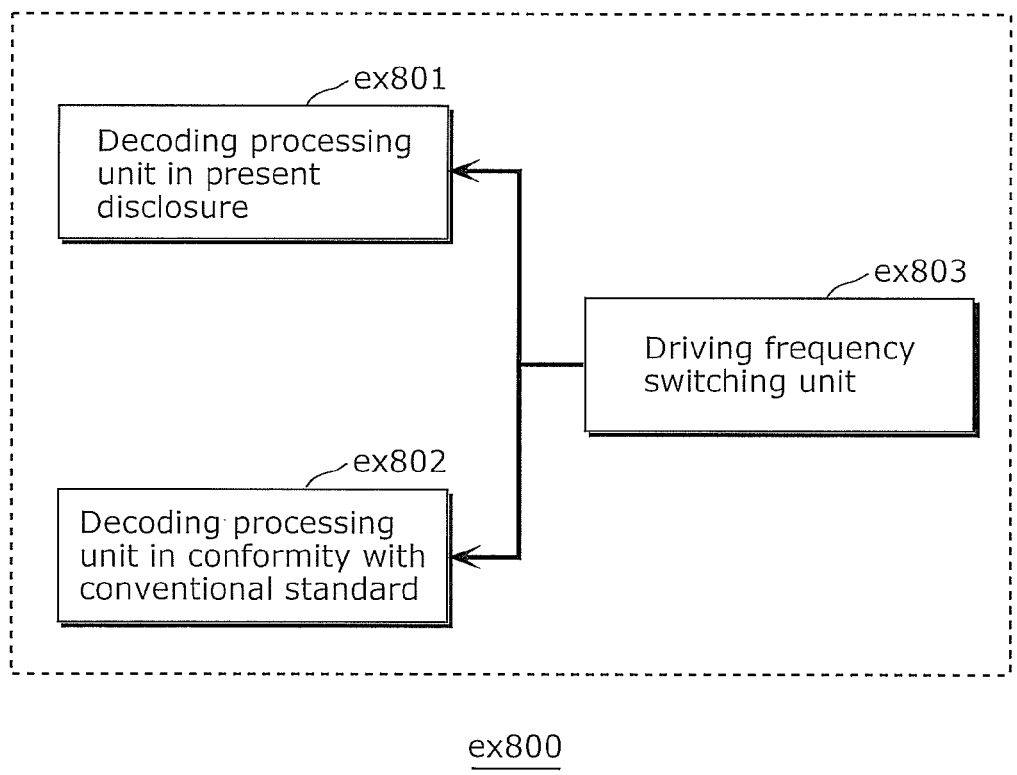
FIG. 31 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 31 illustrates a configuration ex800 in Embodiment 6. A driving frequency switching unit ex803 sets a driving frequency to a higher driving frequency when video data is generated by the moving picture coding method or the moving picture coding apparatus described in each of Embodiments. Then, the driving frequency switching unit ex803 instructs a decoding processing unit ex801 that executes the moving picture decoding method described in each of Embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 30. Here, each of the decoding processing unit ex801 that executes the moving picture decoding method described in each of Embodiments and the decoding processing unit ex802 that conforms to the conventional standard corresponds to the signal processing unit ex507 in FIG. 30. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 33. The driving frequency can be selected by storing the look-up table in the buffer ex508 and an internal memory of an LSI, and with reference to the look-up table by the CPU ex502.

Figure 32:
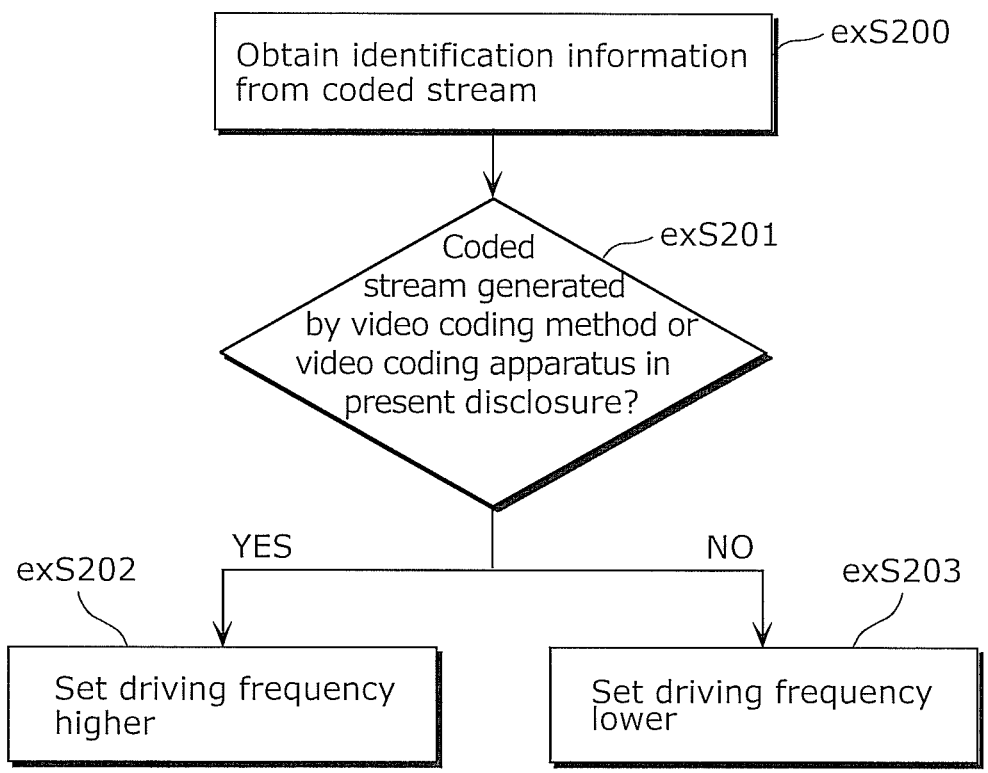
FIG. 32 illustrates steps for identifying video data and switching between driving frequencies.

FIG. 32 illustrates steps for executing a method in Embodiment 6. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the coding method or the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method or the coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG4-AVC is larger than the computing amount for decoding video data generated by the moving picture coding method or the moving picture coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method or the moving picture coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method or the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method or the moving picture coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 7)

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 34A:
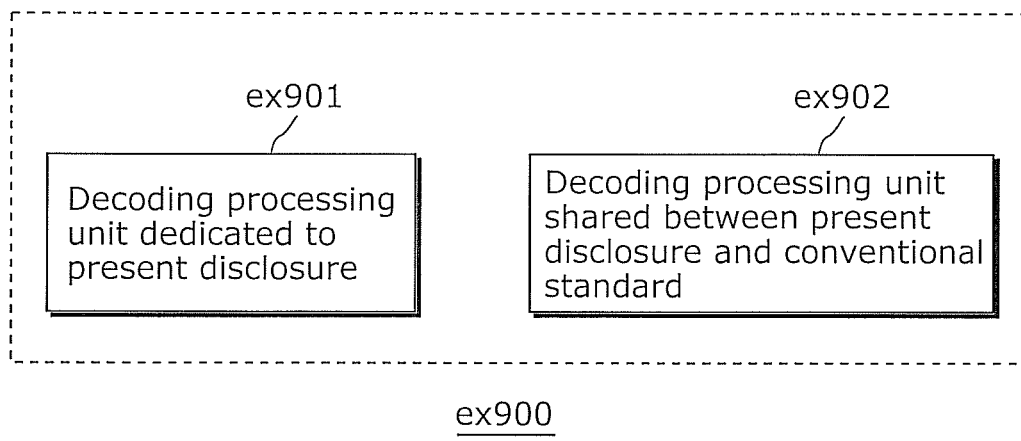
FIG. 34A illustrates an example of a configuration for sharing a module of a signal processing unit.

In order to solve the problems, what is conceived is a configuration in which the decoding processing unit for implementing the moving picture decoding method described in each of Embodiments and the decoding processing unit that conforms to the conventional standard, such as MPEG-2, MPEG4-AVC, and VC-1 are partly shared. Ex900 in FIG. 34A shows an example of the configuration. For example, the moving picture decoding method described in each of Embodiments and the moving picture decoding method that conforms to MPEG4-AVC have, partly in common, the details of processing, such as entropy coding, inverse quantization, deblocking filtering, and motion compensation. The details of processing to be shared probably include use of a decoding processing unit ex902 that conforms to MPEG4-AVC. In contrast, a dedicated decoding processing unit ex901 is probably used for other processing which is unique to the present disclosure and does not conform to MPEG-4 AVC. The decoding processing unit for implementing the moving picture decoding method described in each of Embodiments may be shared for the processing to be shared, and a dedicated decoding processing unit may be used for processing unique to that of MPEG4-AVC.

Figure 34B:
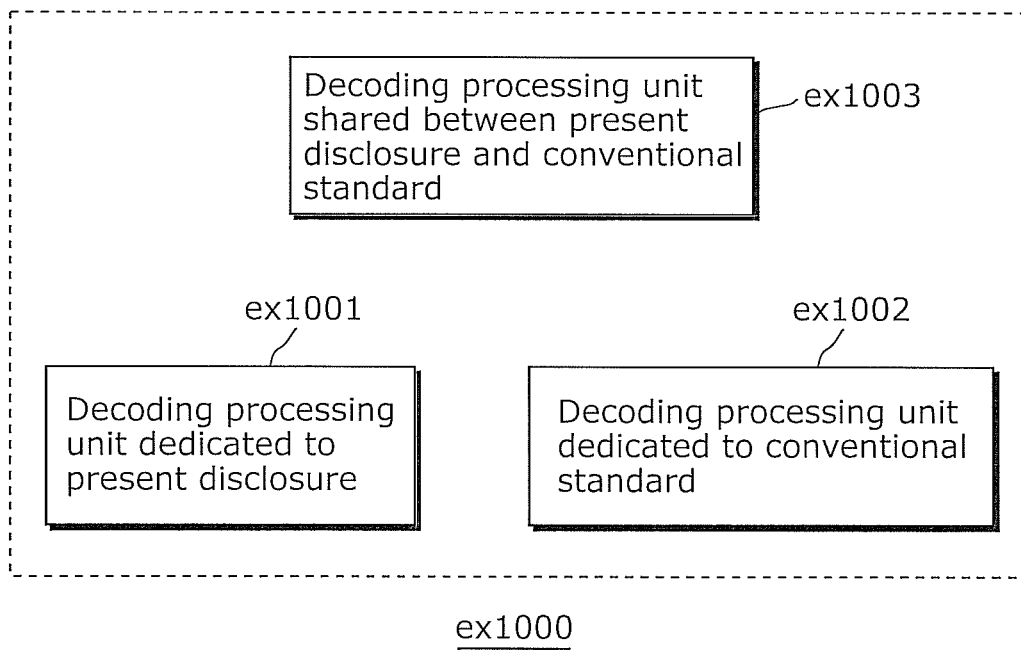
FIG. 34B illustrates an example of a configuration for sharing a module of a signal processing unit.

Furthermore, ex1000 in FIG. 34B shows another example in which processing is partly shared. This example uses a configuration including a dedicated decoding processing unit ex1001 that supports the processing unique to the aspect of the present disclosure, a dedicated decoding processing unit ex1002 that supports the processing unique to another conventional standard, and a decoding processing unit ex1003 that supports processing to be shared between the moving picture decoding method in the aspect of the present disclosure and the conventional moving picture decoding method. Here, the dedicated decoding processing units ex1001 and ex1002 are not necessarily specialized for the processing of the aspect of the present disclosure and the processing of the conventional standard, and may be the ones capable of implementing general processing. Furthermore, the configuration of Embodiment 7 can be implemented by the LSI ex500.

As such, reducing the scale of the circuit of an LSI and reducing the cost are possible by sharing the decoding processing unit for the processing to be shared between the moving picture decoding method in the present disclosure and the moving picture decoding method in conformity with the conventional standard.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The present disclosure has an advantage of accelerating processing with almost no reduction in the coding efficiency, and is applicable to various uses, such as accumulation, transmission, and communication of data. The present disclosure is applicable to, for example, information display apparatuses and image-capturing apparatuses that are of high resolution, such as televisions, digital video recorders, car navigation systems, mobile phones, digital cameras, and digital video cameras, and is highly suitable for practical use.

The invention claimed is:

1. A moving picture coding method for performing arithmetic coding on a quantization parameter to be used in quantizing a current block that is to be coded and is included in a current picture to be coded, the quantization parameter including a parameter indicating a sign and a parameter indicating an absolute value, the parameter indicating the absolute value including a prefix and a suffix, the method comprising:
   binarizing an entirety of the prefix by applying a truncated unary code to the entirety of the prefix;
   binarizing the suffix by applying an exponential Golomb code to the suffix;
   binarizing the parameter indicating the sign by applying an exponential Golomb code to the parameter indicating the sign;
   performing context arithmetic coding, using an adaptive symbol occurrence probability, on a first half of the prefix binarized by applying the truncated unary code to the prefix;
   performing bypass arithmetic coding, using a fixed probability, on (i) a latter half of the prefix binarized by applying the truncated unary code to the prefix, (ii) the binarized suffix, and (iii) the binarized parameter indicating the sign.

2. The moving picture coding method according to claim 1,
   wherein the arithmetic coding of the quantization parameter is arithmetic coding of a delta value between a quantization parameter of a block to be coded immediately before the current block and the quantization parameter of the current block.

3. A moving picture decoding method for performing arithmetic decoding on a coded quantization parameter to be used in inversely quantizing a current block that is to be decoded and is included in a current picture to be decoded, the coded quantization parameter sequentially including a coded parameter indicating an absolute value and a coded parameter indicating a sign, the coded parameter indicating the absolute value including a coded prefix and a coded suffix, the coded prefix including a coded first half and a coded latter half, the method comprising:
   performing context arithmetic decoding, using an adaptive symbol occurrence probability, on the coded first half of the coded prefix;
   performing bypass arithmetic decoding, using a fixed probability, on (i) the coded latter half of the coded prefix, (ii) the coded suffix, and (iii) the coded parameter indicating the sign;
   inversely binarizing an entirety of a decoded prefix by applying the truncated unary to the entirety of the decoded prefix, the decoded prefix including a decoded first half and a decoded latter half and being obtained by performing the context arithmetic decoding on the coded first half of the coded prefix and performing the bypass arithmetic decoding on the latter half of the coded prefix;
   inversely binarizing a decoded suffix by applying an exponential Golomb code to the decoded suffix, the decoded suffix being obtained by performing the bypass arithmetic decoding on the coded suffix; and
   inversely binarizing the decoded parameter indicating the sign by applying an exponential Golomb code to the decoded parameter indicating the sign.

4. The moving picture decoding method according to claim 3,
   wherein the arithmetic decoding of the coded quantization parameter is arithmetic decoding of a delta value between a quantization parameter of a block to be decoded immediately before the current block and the quantization parameter of the current block.

5. A moving picture coding apparatus, comprising
   control circuitry and storage accessible from the control circuitry,
   wherein the control circuitry executes the moving picture coding method according to claim 1.

6. A moving picture decoding apparatus, comprising
   control circuitry and storage accessible from the control circuitry,
   wherein the control circuitry executes the moving picture decoding method according to claim 3.

7. A moving picture coding and decoding apparatus, comprising
   control circuitry and storage accessible from the control circuitry,
   wherein the control circuitry executes the moving picture coding method according to claim 1,
   the coded quantization parameter sequentially includes a coded parameter indicating an absolute value and a coded parameter indicating a sign, the coded parameter indicating the absolute value including a coded prefix and a coded suffix, the coded prefix including a coded first half and a coded latter half, and
   the control circuitry further executes:
   performing context arithmetic decoding, using an adaptive symbol occurrence probability, on the coded first half of the coded prefix;
   performing bypass arithmetic decoding, using a fixed probability, on (i) the coded latter half of the coded prefix, (ii) the coded suffix, and (iii) the coded parameter indicating the sign;
   inversely binarizing an entirety of a decoded prefix by applying the truncated unary to the entirety of the decoded prefix, the decoded prefix including a decoded first half and a decoded latter half and being obtained by performing the context arithmetic decoding on the coded first half of the coded prefix and performing the bypass arithmetic decoding on the latter half of the coded prefix;
   inversely binarizing a decoded suffix by applying an exponential Golomb code to the decoded suffix, the decoded suffix being obtained by performing the bypass arithmetic decoding on the coded suffix; and
   inversely binarizing the decoded parameter indicating the sign by applying an exponential Golomb code to the decoded parameter indicating the sign.

8. The moving picture coding method according to claim 1, further comprising:
binarizing, using a truncated unary code, a flag indicating whether the absolute value is zero; and
performing context arithmetic coding on the binarized flag using an adaptive symbol occurrence probability.

9. The moving picture decoding method according to claim 3,
wherein the coded quantization parameter further includes a coded flag indicating whether the absolute value is zero, and
the moving picture decoding method further comprises:
performing context arithmetic decoding on the coded flag using an adaptive symbol occurrence probability; and
inversely binarizing the decoded flag using a truncated unary code.

10. The moving picture coding method according to claim 1,
wherein the binarized prefix is an n-bit signal, where n is an integer greater than or equal to 2,
the first half of the binarized prefix is a signal consisting of a leading bit of the binarized prefix, and
the latter half of the binarized prefix is a signal consisting of at least one bit that is subsequent to the leading bit.

11. The moving picture coding method according to claim 1,
wherein the binarized prefix is an n-bit signal, where n is an integer greater than or equal to 3,
the first half of the binarized prefix is a signal consisting of a leading bit and a bit immediately subsequent to the leading bit of the binarized prefix, and
the latter half of the binarized prefix is a signal consisting of at least one bit that is subsequent to the bit immediately subsequent to the leading bit of the binarized prefix.

12. The moving picture decoding method according to claim 3,
wherein the decoded prefix is an n-bit signal, where n is an integer greater than or equal to 2,
the first half of the decoded prefix is a signal consisting of a leading bit of the decoded prefix, and
the latter half of the decoded prefix is a signal consisting of at least one bit that is subsequent to the leading bit of the decoded prefix.

13. The moving picture decoding method according to claim 3,
wherein the decoded prefix is an n-bit signal, where n is an integer greater than or equal to 3,
the first half of the decoded prefix is a signal consisting of a leading bit and a bit immediately subsequent to the leading bit of the decoded prefix, and
the latter half of the decoded prefix is a signal consisting of at least one bit that is subsequent to the bit immediately subsequent to the leading bit of the decoded prefix.

* * * * *